*(12)* United States Patent
Tsujita

(10) Patent No.: US 9,519,448 B2
(45) Date of Patent: Dec. 13, 2016

(54) PRINTING SYSTEM, PRINTING APPARATUS, PRINTING CONTROL APPARATUS, SHEET MANAGEMENT SYSTEM, PRINTING CONTROL APPARATUS CONTROL METHOD, AND RELATED STORAGE MEDIUM

(71) Applicant: CANON KABUSHIKI KAISHA, Tokyo (JP)

(72) Inventor: Kosuke Tsujita, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/561,122

(22) Filed: Dec. 4, 2014

(65) Prior Publication Data

US 2015/0160902 A1 Jun. 11, 2015

(30) Foreign Application Priority Data

Dec. 9, 2013 (JP) .................. 2013-254564

(51) Int. Cl.
*G06F 3/12* (2006.01)
*G06K 15/00* (2006.01)

(52) U.S. Cl.
CPC .......... *G06F 3/1257* (2013.01); *G06F 3/1204* (2013.01); *G06F 3/1288* (2013.01); *G06K 15/002* (2013.01)

(58) Field of Classification Search
CPC .... G06F 3/1237; G06F 3/1242; G06F 3/1244; G06F 3/125; G06F 3/1259; G06F 3/1261; G06F 3/1273
USPC ...... 358/1.15, 1.13, 1.9, 1.14, 1.16, 1.2, 3.1; 399/38, 341, 223, 24, 27, 44, 8, 81; 382/112, 165, 224
See application file for complete search history.

(56) References Cited

U.S. PATENT DOCUMENTS

| | | | |
|---|---|---|---|
| 5,110,106 A * | 5/1992 | Matsumura .............. | B65H 7/02 271/171 |
| 5,379,100 A * | 1/1995 | Kudo et al. .................. | 399/351 |
| 5,502,555 A * | 3/1996 | Lakatos ........................ | 399/140 |
| 6,256,473 B1 * | 7/2001 | Kamanuma .......... | G03G 15/507 399/367 |
| 7,992,858 B2 * | 8/2011 | Sagawa et al. ............ | 271/10.01 |
| 9,013,751 B2 * | 4/2015 | Inui ................................ | 358/1.9 |
| 9,122,974 B2 * | 9/2015 | Tsujita et al. | |
| 2007/0263242 A1 * | 11/2007 | Takahashi .................... | 358/1.14 |

(Continued)

FOREIGN PATENT DOCUMENTS

JP  2007-241425 A  9/2007

*Primary Examiner* — Negussie Worku
(74) *Attorney, Agent, or Firm* — Canon USA, Inc. IP Division

(57) ABSTRACT

A printing system includes a printing apparatus and a control apparatus. The printing apparatus obtains first attribute information about a sheet stored in a first sheet holding unit of the printing apparatus, and sends the information to the control apparatus. The control apparatus determines a combination of the first and second attribute information about the sheet and selects at least the first and a second sheet holding units. The control apparatus stores the combination in association with the selected first and second sheet holding units where a user instruction is accepted. The control apparatus obtains the second attribute information based on the received first attribute information, and sends the second attribute information to the printing apparatus. The printing apparatus sets the received second attribute information as attribute information about the sheet stored in the first sheet holding unit.

20 Claims, 23 Drawing Sheets

(56) References Cited

U.S. PATENT DOCUMENTS

| | | | | |
|---|---|---|---|---|
| 2010/0003046 A1* | 1/2010 | Tsujita | .............. | G03G 15/5087 399/82 |
| 2010/0196042 A1* | 8/2010 | Tsujita | .............. | G03G 15/2039 399/82 |
| 2011/0038015 A1* | 2/2011 | Tsujita | .............. | H04N 1/32144 358/448 |
| 2011/0058840 A1* | 3/2011 | Tsujita | .............. | G03G 15/5012 399/82 |
| 2012/0002223 A1* | 1/2012 | Tanaka | ......................... | 358/1.9 |
| 2014/0376028 A1* | 12/2014 | Tsujita | .............. | G06K 15/4065 358/1.14 |
| 2014/0376048 A1* | 12/2014 | Tsujita | .............. | G06K 15/4065 358/1.15 |
| 2015/0015916 A1* | 1/2015 | Kikuchi | ............ | G06K 15/1848 358/3.24 |
| 2015/0055175 A1* | 2/2015 | Iida | ............................. | 358/1.15 |
| 2015/0062635 A1* | 3/2015 | Anno | ................ | G06K 15/4065 358/1.15 |
| 2015/0090562 A1* | 4/2015 | Kawashima | .................. | 198/787 |
| 2015/0103367 A1* | 4/2015 | Tsujita | .............. | G06K 15/4065 358/1.13 |
| 2015/0109628 A1* | 4/2015 | Unno | .......................... | 358/1.12 |
| 2015/0210473 A1* | 7/2015 | Sharratt | .................. | B65G 7/02 16/42 R |
| 2015/0235116 A1* | 8/2015 | Inui | ........................ | B65H 7/06 358/1.15 |
| 2015/0347065 A1* | 12/2015 | Tsujita | .............. | G03G 15/6508 358/1.15 |

* cited by examiner

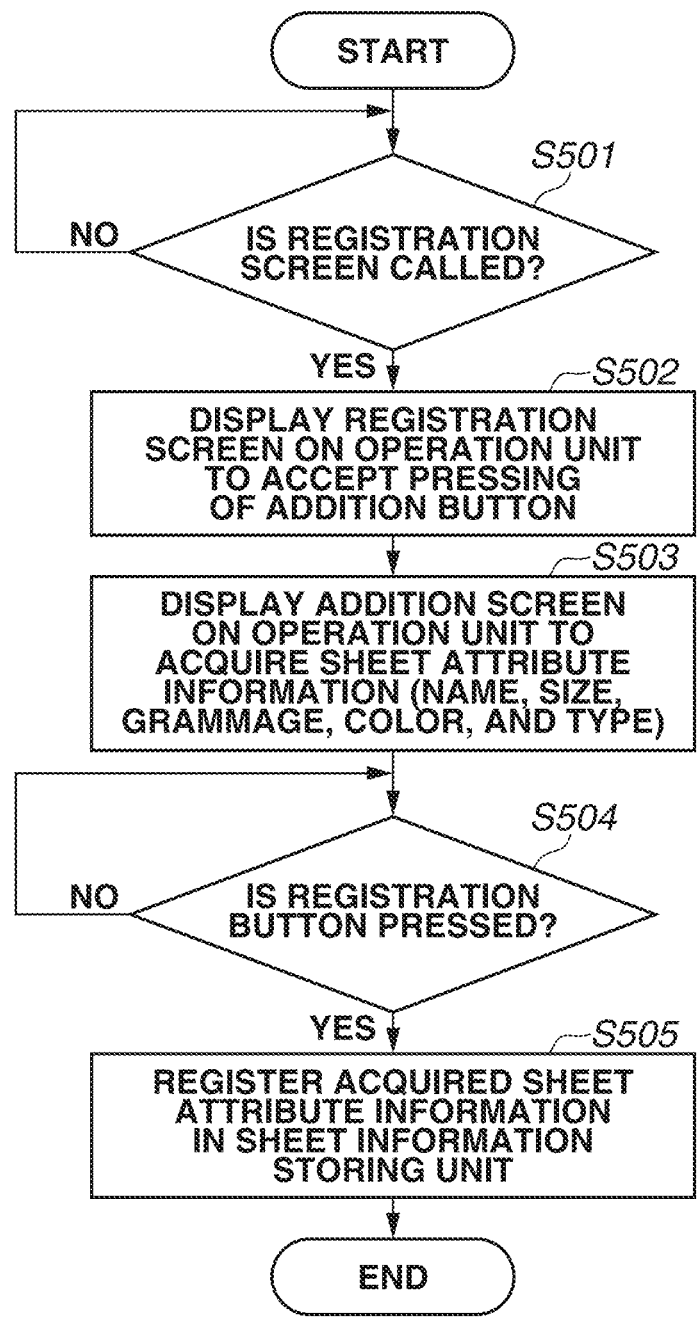

FIG.6A

SHEET INFORMATION REGISTRATION

| ID | NAME | SIZE | GRAMMAGE | COLOR | TYPE |
|---|---|---|---|---|---|
| 001 | A CORPORATION Media1 | A4 | 62 g/m$^2$ | White | PLAIN PAPER |
| 002 | A CORPORATION Media2 | A4 | 80 g/m$^2$ | Yellow | COATED PAPER |
| 003 | A CORPORATION Custom | A4 | 62 g/m$^2$ | Red | PLAIN PAPER |
| 004 | B CORPORATION Premium | A3 | 128 g/m$^2$ | White | THICK PAPER |
| 005 | C CORPORATION Excellent | B4 | 150 g/m$^2$ | White | THICK PAPER |
| 006 | Paper1 | A4 | 64 g/m$^2$ | Blue | COATED PAPER |
| 007 | Paper2 | A3 | 80 g/m$^2$ | White | PLAIN PAPER |
| 008 | MyPaper | A4 | 100 g/m$^2$ | Yellow | TAB SHEET |
| ... | ... | ... | ... | ... | ... |

[ADD]  [DELETE]  [CLOSE]

FIG.6B

NEW ADDITION

NAME: A CORPORATION Media1

SHEET CHARACTERISTICS (TYPE/GRAMMAGE/COLOR): PLAIN PAPER, 62 g/m$^2$, White  [CUSTOM...]

OUTPUT SHEET SIZE: A4  [CUSTOM...]

[REGISTRATION]  [CANCEL]

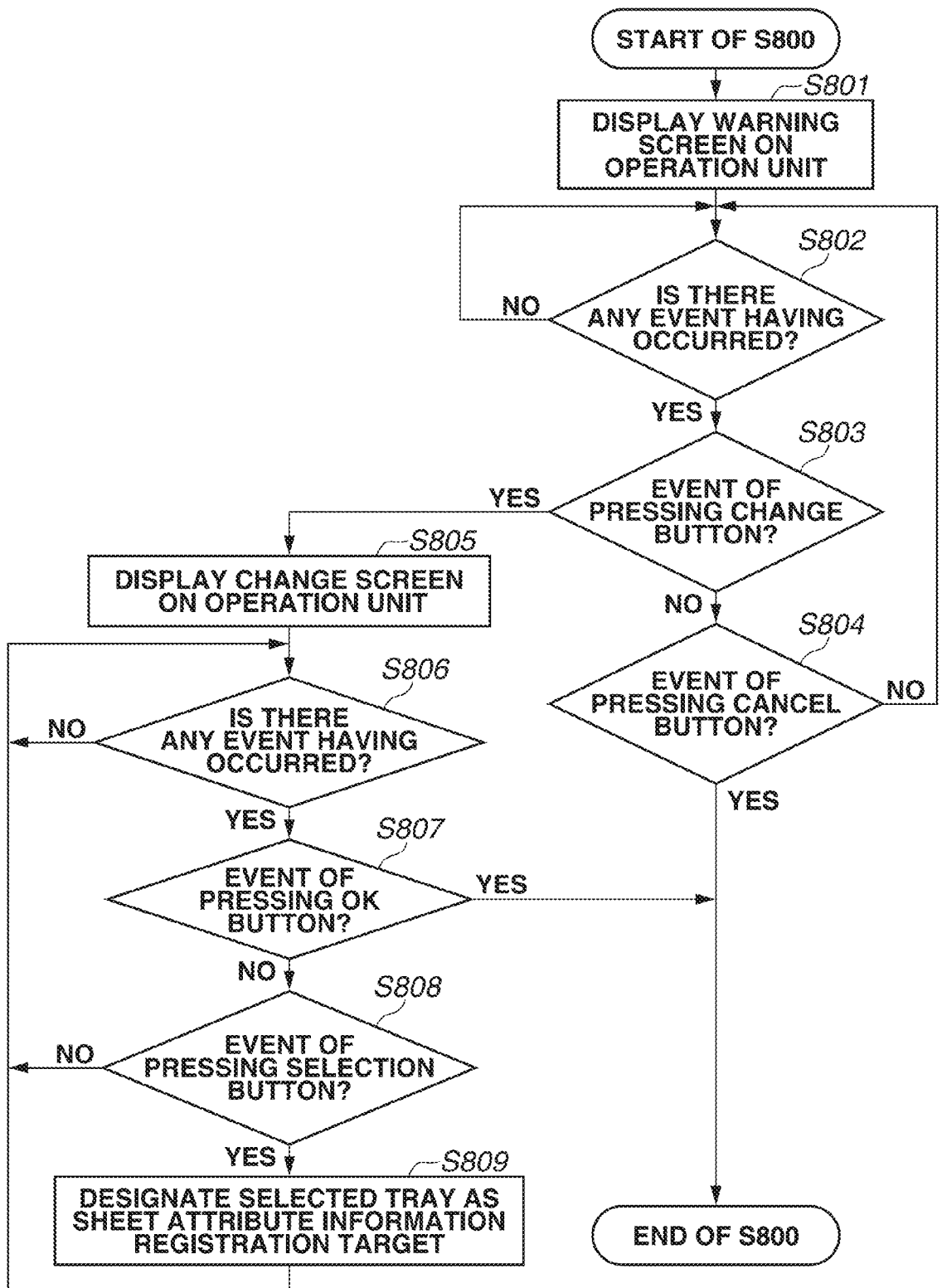

FIG.9A

TRAY REGISTRATION

SELECT SHEET ATTRIBUTE INFORMATION REGISTRATION TARGET TRAY.

| SIZE | NAME | SHEET CHARACTERISTICS (GRAMMAGE, COLOR, AND TYPE) | TRAY ALL | 1 | 2 | 3 | 4 | 5 | 6 | 7 | 8 | MANUAL |
|---|---|---|---|---|---|---|---|---|---|---|---|---|
| A4 | A CORPORATION Custom | 62 g/m², Red, PLAIN PAPER | ☐ | ☑ | ☑ | ☑ | ☐ | ☐ | ☐ | ☐ | ☐ | ☐ |
| A4 | MyPaper | 100 g/m², Yellow, TAB SHEET | ☐ | ☐ | ☐ | ☐ | ☐ | ☐ | ☐ | ☐ | ☐ | ☑ |
| A3 | Paper2 | 80 g/m², White, PLAIN PAPER | ☑ | ☐ | ☐ | ☐ | ☐ | ☐ | ☐ | ☐ | ☐ | ☐ |

[ADD]  [DELETE]

[REGISTRATION]

FIG.9B

TRAY REGISTRATION

SELECT SHEET ATTRIBUTE INFORMATION REGISTRATION TARGET TRAY.

| SIZE | NAME | SHEET CHARACTERISTICS (GRAMMAGE, COLOR, AND TYPE) | TRAY ALL | 1 | 2 | 3 | 4 | 5 | 6 | 7 | 8 | MANUAL |
|---|---|---|---|---|---|---|---|---|---|---|---|---|
| A4 | A CORPORATION Custom | 62 g/m², Red, PLAIN PAPER | ☐ | ☑ | ☑ | ☑ | ☐ | ☐ | ☐ | ☐ | ☐ | ☐ |
| A4 | MyPaper | 100 g/m², Yellow, TAB SHEET | ☐ | ☐ | ☐ | ☐ | ☐ | ☐ | ☐ | ☐ | ☐ | ☑ |
| A3 | Paper2 | 80 g/m², White, PLAIN PAPER | ☑ | ☐ | ☐ | ☐ | ☐ | ☐ | ☐ | ☐ | ☐ | ☐ |
| A4 | A CORPORATION Media2 | 80 g/m², Yellow, COATED PAPER | ☐ | ☑ | ☐ | ☐ | ☐ | ☑ | ☐ | ☐ | ☐ | ☐ |

[ADD]  [DELETE]

[REGISTRATION]

FIG.10

NEW ADDITION

SELECT SHEET TO BE ADDITIONALLY REGISTERED FOR TRAY.

| ID  | NAME                 | SIZE | GRAMMAGE   | COLOR  | TYPE         |
|-----|----------------------|------|------------|--------|--------------|
| 001 | A CORPORATION Media1 | A4   | 62 g/m$^2$ | White  | PLAIN PAPER  |
| 002 | A CORPORATION Media2 | A4   | 80 g/m$^2$ | Yellow | COATED PAPER |
| 003 | A CORPORATION Custom | A4   | 62 g/m$^2$ | Red    | PLAIN PAPER  |
| 004 | B CORPORATION Premium| A3   | 128 g/m$^2$| White  | THICK PAPER  |
| 005 | C CORPORATION Excellent | B4 | 150 g/m$^2$| White  | THICK PAPER  |
| 006 | Paper1               | A4   | 64 g/m$^2$ | Blue   | COATED PAPER |
| 007 | Paper2               | A3   | 80 g/m$^2$ | White  | PLAIN PAPER  |
| 008 | MyPaper              | A4   | 100 g/m$^2$| Yellow | TAB SHEET    |
| ... | ...                  | ...  | ...        | ...    | ...          |

[ OK ]   [ CANCEL ]

| TRAY | NAME | SIZE | GRAMMAGE | COLOR | TYPE |
|---|---|---|---|---|---|
| Tray1 | A CORPORATION Custom | A4 | 62 g/m² | Red | PLAIN PAPER |
| | Paper2 | A3 | 80 g/m² | White | PLAIN PAPER |
| Tray2 | A CORPORATION Custom | A4 | 62 g/m² | Red | PLAIN PAPER |
| | Paper2 | A3 | 80 g/m² | White | PLAIN PAPER |
| Tray3 | A CORPORATION Custom | A4 | 62 g/m² | Red | PLAIN PAPER |
| | Paper2 | A3 | 80 g/m² | White | PLAIN PAPER |
| Tray4 | Paper2 | A3 | 80 g/m² | White | PLAIN PAPER |
| | | | | | |
| Tray5 | Paper2 | A3 | 80 g/m² | White | PLAIN PAPER |
| | | | | | |
| Tray6 | Paper2 | A3 | 80 g/m² | White | PLAIN PAPER |
| | | | | | |
| Tray7 | Paper2 | A3 | 80 g/m² | White | PLAIN PAPER |
| | | | | | |
| Tray8 | Paper2 | A3 | 80 g/m² | White | PLAIN PAPER |
| | | | | | |
| MANUAL Tray | MyPaper | A4 | 100 g/m² | Yellow | TAB SHEET |
| | Paper2 | A3 | 80 g/m² | White | PLAIN PAPER |

WARNING

REGISTERING ATTRIBUTE INFORMATION OF A PLURALITY OF SHEETS HAVING SAME SIZE IN ASSOCIATION WITH SAME TRAY IS PROHIBITED.

| SIZE | NAME | SHEET CHARACTERISTICS (GRAMMAGE, COLOR, AND TYPE) |
|---|---|---|
| A4 | A CORPORATION Custom | 62 g/m$^2$, Red, PLAIN PAPER |
| A4 | A CORPORATION Media2 | 80 g/m$^2$, Yellow, COATED PAPER |

IS CHANGING SHEET ATTRIBUTION INFORMATION REGISTRATION TARGET TRAY NECESSARY?

[CHANGE] *1201*    [CANCEL] *1202*

TRAY CHANGE

CHANGE SHEET ATTRIBUTION INFORMATION REGISTRATION TARGET TRAY.

| SIZE | NAME | SHEET CHARACTERISTICS (GRAMMAGE, COLOR, AND TYPE) | TRAY ALL | 1 | 2 | 3 | 4 | 5 | 6 | 7 | 8 | MANUAL |
|---|---|---|---|---|---|---|---|---|---|---|---|---|
| A4 | A CORPORATION Custom | 62 g/m$^2$, Red, PLAIN PAPER | ☐ | ☐ | ☑ | ☑ | ☐ | ☐ | ☐ | ☐ | ☐ | ☐ |
| A4 | A CORPORATION Media2 | 80 g/m$^2$, Yellow, COATED PAPER | ☐ | ☑ | ☐ | ☐ | ☐ | ☑ | ☐ | ☐ | ☐ | ☐ |

911 — (first row)  914 — (second row)  *1211*

[OK] *1212*   [CANCEL]

| TRAY | NAME | SIZE | GRAMMAGE | COLOR | TYPE |
|---|---|---|---|---|---|
| Tray1 | A CORPORATION Media2 | A4 | 80 g/m² | Yellow | COATED PAPER |
| | Paper2 | A3 | 80 g/m² | White | PLAIN PAPER |
| Tray2 | A CORPORATION Custom | A4 | 62 g/m² | Red | PLAIN PAPER |
| | Paper2 | A3 | 80 g/m² | White | PLAIN PAPER |
| Tray3 | A CORPORATION Custom | A4 | 62 g/m² | Red | PLAIN PAPER |
| | Paper2 | A3 | 80 g/m² | White | PLAIN PAPER |
| Tray4 | Paper2 | A3 | 80 g/m² | White | PLAIN PAPER |
| | | | | | |
| Tray5 | A CORPORATION Media2 | A4 | 80 g/m² | Yellow | COATED PAPER |
| | Paper2 | A3 | 80 g/m² | White | PLAIN PAPER |
| Tray6 | Paper2 | A3 | 80 g/m² | White | PLAIN PAPER |
| | | | | | |
| Tray7 | Paper2 | A3 | 80 g/m² | White | PLAIN PAPER |
| | | | | | |
| Tray8 | Paper2 | A3 | 80 g/m² | White | PLAIN PAPER |
| | | | | | |
| MANUAL Tray | MyPaper | A4 | 100 g/m² | Yellow | TAB SHEET |
| | Paper2 | A3 | 80 g/m² | White | PLAIN PAPER |

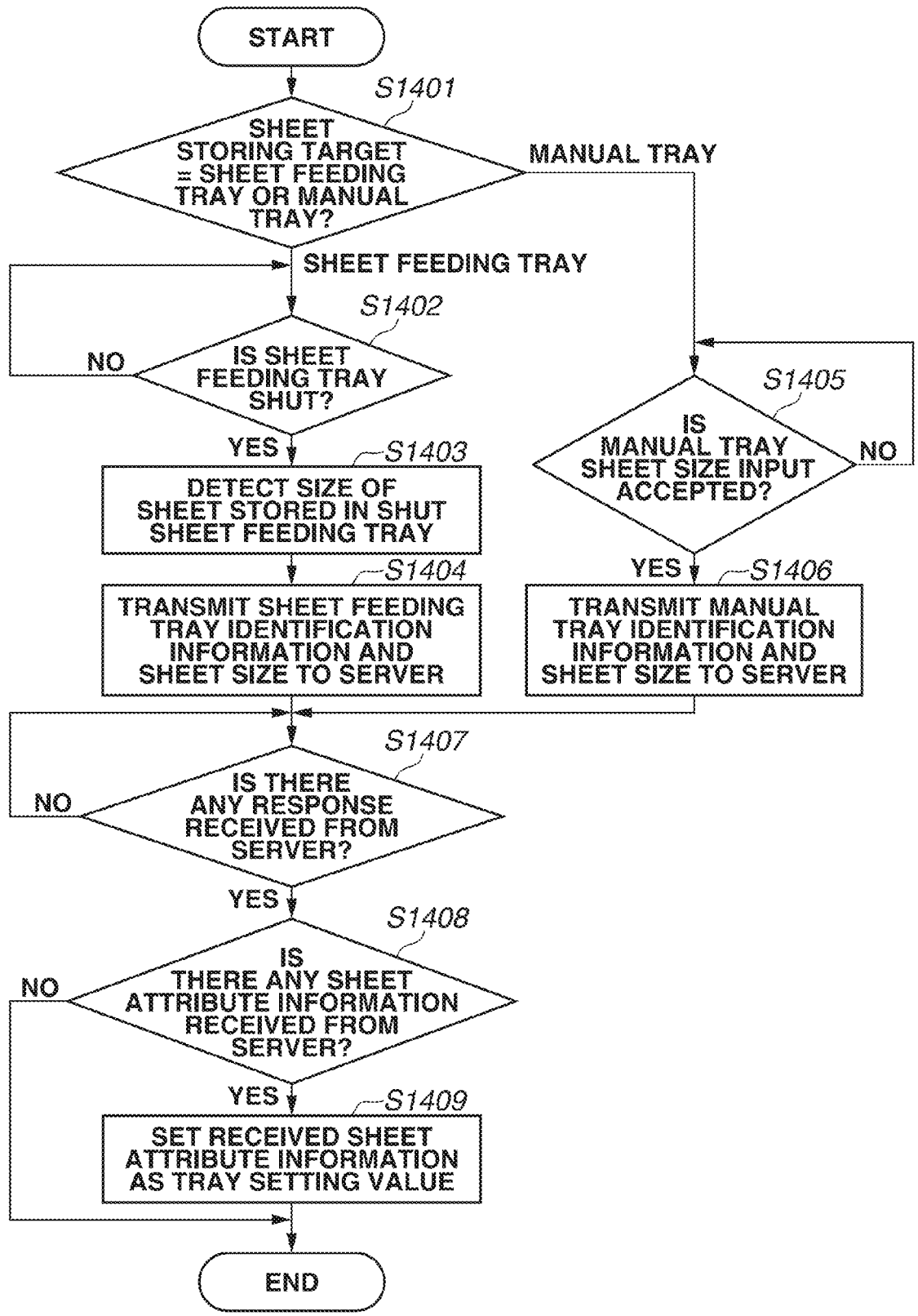

FIG.18A

TRAY REGISTRATION

DESIGNATE NUMBER OF SHEET ATTRIBUTE INFORMATION REGISTRATION TARGET TRAYS.

| SIZE | NAME | SHEET CHARACTERISTICS (GRAMMAGE, COLOR, AND TYPE) | NUMBER OF TRAYS (Max: 9) |
|---|---|---|---|
| A4 | A CORPORATION Media1 | 62 g/m$^2$, White, PLAIN PAPER | 3 |

[ADD] [DELETE]

[REGISTRATION]

FIG.18B

TRAY REGISTRATION

DESIGNATE NUMBER OF SHEET ATTRIBUTE INFORMATION REGISTRATION TARGET TRAYS.

| SIZE | NAME | SHEET CHARACTERISTICS (GRAMMAGE, COLOR, AND TYPE) | NUMBER OF TRAYS (Max: 9) |
|---|---|---|---|
| A4 | A CORPORATION Media1 | 62 g/m$^2$, White, PLAIN PAPER | 3 |
| A4 | Paper1 | 64 g/m$^2$, Blue, COATED PAPER | 2 |

[ADD] [DELETE]

[REGISTRATION]

FIG.19

NEW ADDITION

SELECT SHEET TO BE ADDITIONALLY REGISTERED FOR TRAY.

| ID | NAME | SIZE | GRAMMAGE | COLOR | TYPE |
|---|---|---|---|---|---|
| 001 | A CORPORATION Media1 | A4 | 62 g/m$^2$ | White | PLAIN PAPER |
| 002 | A CORPORATION Media2 | A4 | 80 g/m$^2$ | Yellow | COATED PAPER |
| 003 | A CORPORATION Custom | A4 | 62 g/m$^2$ | Red | PLAIN PAPER |
| 004 | B CORPORATION Premium | A3 | 128 g/m$^2$ | White | THICK PAPER |
| 005 | C CORPORATION Excellent | B4 | 150 g/m$^2$ | White | THICK PAPER |
| 006 | Paper1 | A4 | 64 g/m$^2$ | Blue | COATED PAPER |
| 007 | Paper2 | A3 | 80 g/m$^2$ | White | PLAIN PAPER |
| 008 | MyPaper | A4 | 100 g/m$^2$ | Yellow | TAB SHEET |
| ... | ... | ... | ... | ... | ... |

OK    CANCEL

FIG.21

TRAY REGISTRATION

SELECT SHEET ATTRIBUTE INFORMATION REGISTRATION TARGET TRAY.

| SIZE | NAME | SHEET CHARACTERISTICS (GRAMMAGE, COLOR, AND TYPE) | NUMBER OF TRAYS |
|---|---|---|---|
| A4 | A CORPORATION Media1 | 62 g/m², White, PLAIN PAPER | 3 |
| A4 | Paper1 | 64 g/m², Blue, COATED PAPER | 1 |

| NAME | Tray4 | Tray6 | Tray7 | Tray8 |
|---|---|---|---|---|
| A CORPORATION Media1 | ○ | ⊙ | ⊙ | ⊙ |
| Paper1 | ⊙ | ○ | ○ | ○ |

REGISTRATION

FIG.22

TRAY CONFIRMATION

REGISTERING SHEET ATTRIBUTE INFORMATION FOR TRAY IS FEASIBLE.

| SIZE | NAME | SHEET CHARACTERISTICS (GRAMMAGE, COLOR, AND TYPE) | NUMBER OF TRAYS |
|---|---|---|---|
| A4 | A CORPORATION Media1 | 62 g/m$^2$, White, PLAIN PAPER | 3 |
| A4 | Paper1 | 64 g/m$^2$, Blue, COATED PAPER | 1 |

| NAME | SHEET ATTRIBUTE INFORMATION REGISTERABLE TRAYS |
|---|---|
| A CORPORATION Media1 | Tray4, Tray6, Tray7, Tray8, |
| Paper1 | |

SHEET SELECTION

SELECT SHEET ATTRIBUTE INFORMATION TO BE STORED AS Tray4 SETTING VALUE.

| SIZE | NAME | SHEET CHARACTERISTICS (GRAMMAGE, COLOR, AND TYPE) | |
|------|------|----------------------------------------------------|---|
| A4 | A CORPORATION Media1 | 62 g/m$^2$, White, PLAIN PAPER | ○ |
| A4 | Paper1 | 64 g/m$^2$, Blue, COATED PAPER | ◉ |

OK

PRINTING SYSTEM, PRINTING APPARATUS, PRINTING CONTROL APPARATUS, SHEET MANAGEMENT SYSTEM, PRINTING CONTROL APPARATUS CONTROL METHOD, AND RELATED STORAGE MEDIUM

BACKGROUND OF THE INVENTION

Field of the Invention

The present invention relates to a printing system, a printing apparatus, a printing control apparatus, a sheet management system, a printing control apparatus control method, and a related storage medium.

Description of the Related Art

When a sheet holding unit provided in a printing apparatus is used to perform a printing operation, storing sheet attribute information (e.g., sheet name, sheet size, sheet grammage, sheet surface nature, and sheet color) beforehand as sheet holding unit setting value is generally performed. To store sheet attribute information as sheet holding unit setting value, it is required every time to input sheet attribute information for each sheet holding unit. Therefore, as discussed in Japanese Patent Application Laid-Open No. 2007-241425, it is conventionally known to register attribute information for each sheet beforehand in a sheet management database and let a user select desired sheet attribute information to be stored as sheet holding unit setting value.

According to the above-mentioned technique discussed in Japanese Patent Application Laid-Open No. 2007-241425, if the number of sheets registered in the sheet management database increases, it will take a significant time for a user to find out a desired sheet from the great number of registered sheets. Therefore, for example, in a case where a printing operation is performed with frequently used sheets stored in a plurality of sheet holding units, setting frequently used sheet attribute information as setting values of the plurality of sheet holding units was a complicated work for each user because the above-mentioned setting must be completed for each sheet holding unit.

SUMMARY OF THE INVENTION

According to an aspect of the present invention, a printing system includes a printing apparatus and a printing control apparatus to communicate with each other. The printing apparatus includes an obtaining unit configured to obtain first attribute information about a sheet stored in a first sheet holding unit of a plurality of sheet holding units of the printing apparatus, and a first sending unit configured to send the first attribute information obtained by the obtaining unit to the printing control apparatus. The printing control apparatus includes a determining unit configured to determine a combination of the first attribute information and second attribute information about the sheet, a selecting unit configured to select at least the first sheet holding unit and a second sheet holding unit from the plurality of sheet holding units, a storing unit configured to store the combination of the first attribute information and the second attribute information about the sheet determined by the determining unit in association with the first sheet holding unit and the second sheet holding unit selected by the selecting unit in a case where a user instruction is accepted in a state where both the first sheet holding unit and the second sheet holding unit have been selected by the selecting unit, a first receiving unit configured to receive the first attribute information sent by the first sending unit, and a second sending unit configured to obtain the second attribute information stored in association with the first attribute information from the storing unit based on the first attribute information received by the first receiving unit, and configured to send the obtained second attribute information to the printing apparatus. The printing apparatus further includes a second receiving unit configured to receive the second attribute information sent by the second sending unit, and a setting unit configured to set the second attribute information received by the second receiving unit as attribute information about the sheet stored in the first sheet holding unit.

In a case where a printing operation is performed with frequently used sheets stored in a plurality of sheet holding units, in order to set frequently used sheet attribute information as setting values of the plurality of sheet holding units, a user needs to set each time the information for each sheet holding unit. In the digital printing system, sheet attribute information is registered beforehand in association with each of a plurality of sheet feeding trays and a manual tray. After a user stores a sheet in a sheet feeding tray or the manual tray, the system acquires attribute information (e.g., size of the stored sheet). The system can automatically set other attribute information about the sheet registered in association with the tray, as tray setting value, based on the acquired attribute information (e.g., sheet size). Further features of the present invention will become apparent from the following description of exemplary embodiments with reference to the attached drawings.

BRIEF DESCRIPTION OF THE DRAWINGS

FIG. 5 is a flowchart illustrating exemplary processing for registering sheet attribute information in a sheet information storing unit, which can be performed by the server according to the first exemplary embodiment.

FIGS. 6A and 6B illustrate registration screens that are usable to register sheet attribute information in the sheet information storing unit, in the server according to the first exemplary embodiment.

FIG. 8 is a flowchart illustrating exemplary processing for changing a sheet attribute information registration tray, which can be performed by the server according to the first exemplary embodiment.

FIGS. 9A and 9B illustrate registration screens that are usable to simultaneously register sheet attribute information in association with each tray in the tray information storing unit, in the server according to the first exemplary embodiment.

FIG. 10 illustrates an addition screen that is usable to add a sheet to be registered in association with each tray, in the server according to the first exemplary embodiment.

FIG. 11 illustrates an example of sheet attribute information registered in the tray information storing unit, in the server according to the first exemplary embodiment.

FIGS. 12A and 12B illustrate a warning screen and a change screen that are usable to register sheet attribute information in the tray information storing unit, in the server according to the first exemplary embodiment.

FIG. 13 illustrates an example of sheet attribute information registered in the tray information storing unit, in the server according to the first exemplary embodiment.

FIG. 14 is a flowchart illustrating exemplary processing for setting sheet attribute information as sheet feeding tray setting value or manual tray setting value, which can be performed by the printing apparatus according to the first exemplary embodiment.

FIGS. 18A and 18B illustrate registration screens that are usable to simultaneously register sheet attribute information in association with each tray in the tray information storing unit, in the server according to the second exemplary embodiment.

FIG. 19 illustrates an addition screen that is usable to add a sheet to be registered in association with each tray, in the server according to the second exemplary embodiment.

FIG. 21 illustrates a registration screen that is usable to simultaneously register sheet attribute information in association with each tray in the tray information storing unit, in the server according to the second exemplary embodiment.

FIG. 22 illustrates a confirmation screen that is usable to register sheet attribute information in the tray information storing unit, in a printing apparatus according to another exemplary embodiment.

FIG. 23 illustrates a selection screen that is usable to select a sheet to be registered in association with each tray in the tray information storing unit, in the printing apparatus according to another exemplary embodiment.

DESCRIPTION OF THE EMBODIMENTS

Various exemplary embodiments, features, and aspects of the invention will be described in detail below with reference to the drawings. Exemplary embodiments described below are not intended to narrowly limit the present invention. Further, it is not always required to include all of characteristic features combined in respective exemplary embodiments as solving means of the present invention.

<Digital Printing System>

Figure 1:
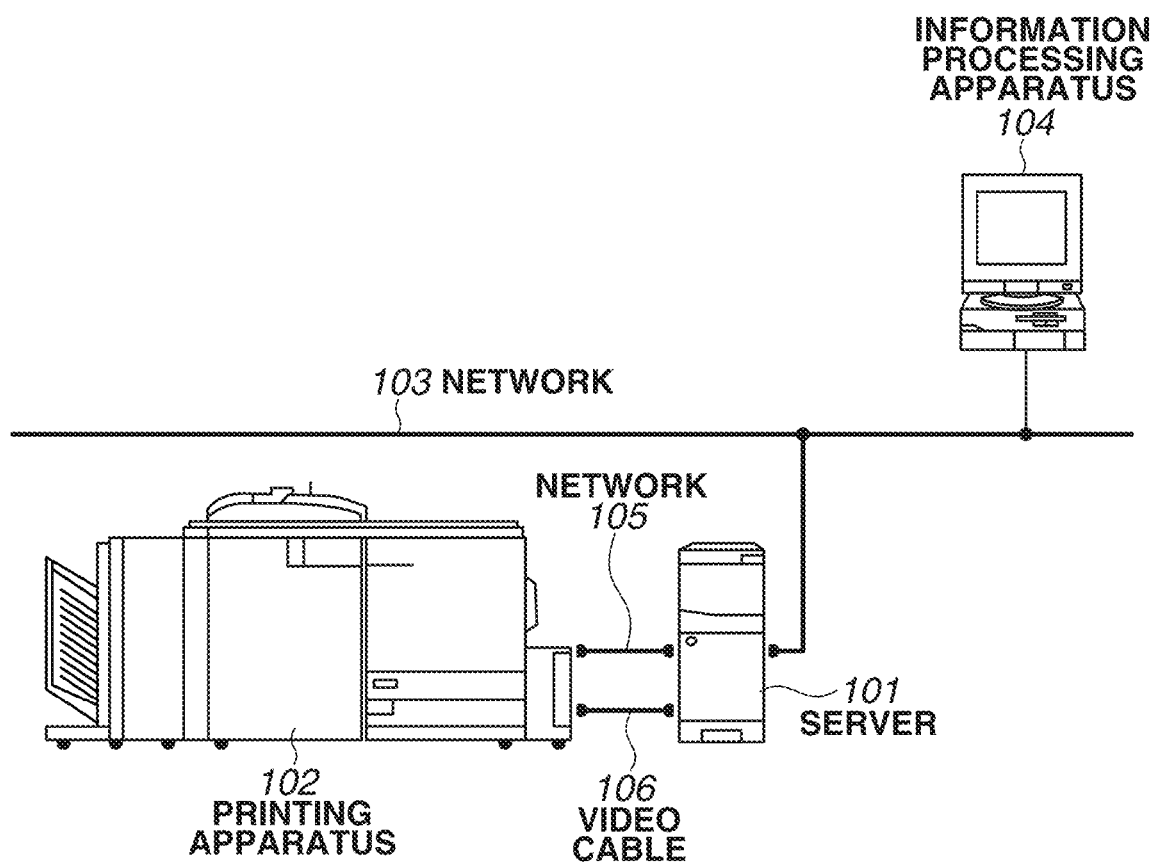
FIG. 1 illustrates a digital printing system according to a first exemplary embodiment of the present invention.

A digital printing system according to a first exemplary embodiment of the present invention is described in detail below with reference to FIG. 1. In the digital printing system, sheet attribute information is registered beforehand in association with each of a plurality of sheet feeding trays and a manual tray. After a user stores a sheet in a sheet feeding tray or the manual tray, the system acquires attribute information (e.g., size of the stored sheet). The system can automatically set other attribute information about the sheet registered in association with the tray, as tray setting value, based on the acquired attribute information (e.g., sheet size).

More specifically, in a case where a printing operation is performed with frequently used sheets stored in a plurality of trays, the system can easily and automatically perform a batch setting of attribute information about the frequently used sheets as setting values of respective trays, as described below.

A digital printing machine (i.e., a printing apparatus) 102 has various (e.g., scan, print, and copy) functions. A server 101 has various (e.g., image processing, print control, and job management) functions. An information processing apparatus (e.g., a computer) 104 has various (e.g., application file editing and print instruction) functions.

In the digital printing system, the printing apparatus 102 is connected to the server 101 via a network 105 and a video cable 106. Further, the server 101 can communicate with the information processing apparatus 104 via a network 103 (e.g., a local area network (LAN) or a wide area network (WAN) or a wireless LAN). The video cable 106 can be used to transfer an image to be printed. The network 105 can be used to transmit and receive other information. Unless otherwise mentioned, the network that connects the printing apparatus 102 and the server 101 is LAN, WAN, or a comparable network as long as it can realize the functions of the present invention.

In the exemplary embodiment of the present invention, the information processing apparatus 104 can transmit and receive various types of data to and from the printing apparatus 102 via the server 101. Further, the server 101 can receive a print job from the information processing apparatus 104 via the network 103 and can transfer the received print job to the printing apparatus 102. Each user can use the information processing apparatus 104 to confirm the status of a job and operational states of the server 101 and the printing apparatus 102. Further, the user can operate the server 101 directly or remotely to store sheet attribute information, as sheet holding unit setting value of the printing apparatus 102, for example, in the printing apparatus (which may be also referred to as sheet management system).

In a case where the information processing apparatus 104 is functionally operable as the server 101, the information processing apparatus 104 can be configured to directly transmit and receive data and commands to and from the printing apparatus 102. In such a case, the information processing apparatus 104 has a configuration similar to that of the server 101 except that the information processing apparatus 104 is connected to the printing apparatus 102 via the network 105 and the video cable 106.

<Configuration of Server>

Figure 2:
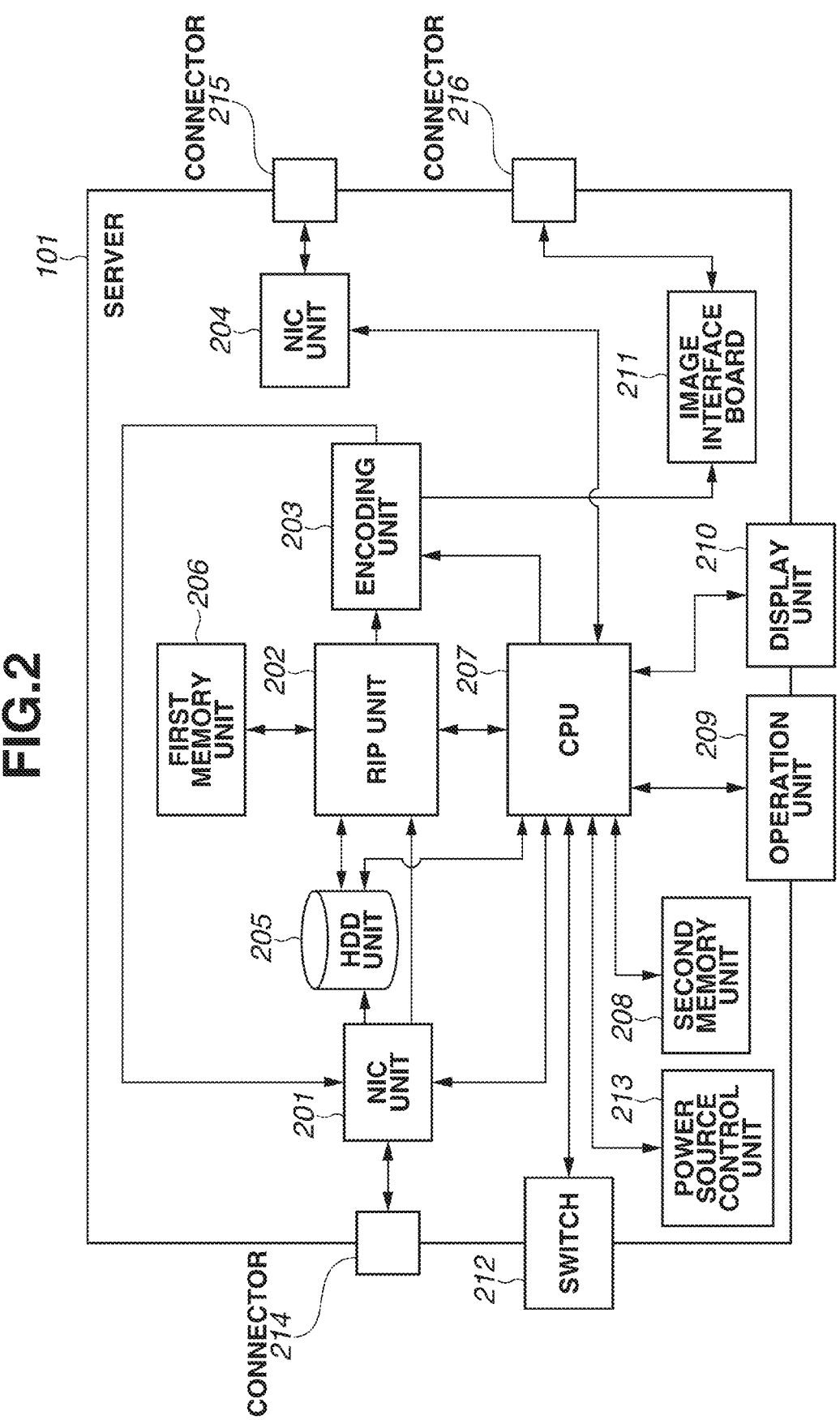
FIG. 2 is a block diagram illustrating a configuration of a server according to the first exemplary embodiment.

A configuration example of the server 101 according to the first exemplary embodiment of the present invention is described in detail below with reference to FIG. 2.

A network interface card (NIC) unit 201 is a first network interface that can control communications to be performed via the network 103. On the other hand, a NIC unit 204 is a second network interface that can control communications to be performed via the network 105. Each of the NIC unit 201 and the NIC unit 204 can control communications via a wireless LAN.

A raster image processor (RIP) unit 202 can perform processing for converting print language data, such as page description language (PDL) data received by the NIC unit 201, or a specific data format into a rasterized image.

An encoding unit 203 can perform processing for converting the rasterized image data into print data having a data format supported by the printing apparatus 102.

A hard disk drive (HDD) unit 205 can temporarily store (spool) the PDL data received by the NIC unit 201 or can temporarily store RIP processed compression data. Further, the HDD unit 205 can store system software applications for various processing described below in addition to data stored in a sheet information storing unit 401 illustrated in FIG. 4 and data stored in a sheet holding unit information storing unit 402 illustrated in FIG. 4. However, instead of using the HDD unit 205, the data stored in the sheet information storing unit 401 and the sheet holding unit information storing unit 402 can be stored in a nonvolatile memory, such as a solid state drive (SSD).

A central processing unit (CPU) 207 can control processing and operations to be performed by various units provided in the server 101. A first memory unit 206 is usable when the RIP unit 202 performs image rasterizing processing. On the other hand, the CPU 207 can use a second memory unit 208 as a temporary data storage area.

An operation unit 209 includes buttons, keys, and a touch panel to enable a user to operate the server 101. A display unit 210 can perform information presenting processing by displaying images and text data. An image interface board 211 and a connector 216 for the image interface board 211 are usable to create image data and transfer the created image data to a dedicated transmission path. A switch 212 is operable to input operational (e.g., power source startup and shutdown) instructions. When the switch 212 is operated, an interrupt signal is input to the CPU 207. The CPU 207 can control a power source control unit 213 according to an operational state in response to the interrupt signal.

A data packet, if it is transmitted from the information processing apparatus 104, can be input to the server 101 via the network 103 and a connector 214. In the server 101, the NIC unit 201 can perform data reception processing. The NIC unit 201 can perform processing for writing received data into the HDD unit 205 under control of the CPU 207, if it is necessary. The above-mentioned processing is referred to as queuing (spool), which is generally performed to improve the transfer speed of data. The RIP unit 202 can read the data stored in the HDD unit 205 according to an instruction from the CPU 207.

Subsequently, the encoding unit 203, which is functionally operable as a data format conversion unit, performs processing for encoding received data into a preliminarily set data format that can be interpreted by the printing apparatus 102 based on the data format that can be interpreted by the printing apparatus 102 and a format of received data. It is necessary that the encoded data has a format that can be interpreted by the printing apparatus 102.

The above-mentioned format is variable depending on the ability of a built-in interpretation unit of the printing apparatus 102. For example, the format is a specific print language format or a data format compressed according to a specific method (e.g., JBIG). The NIC unit 204 performs data packet processing again to transmit the encoded data to the network 105. The data packet can be output from the connector 215 and transmitted to the printing apparatus 102 via the network 105. It is useful to transmit the encoded data to the printing apparatus 102 via a local interface, such as a universal serial bus (USB).

When the printing apparatus 102 receives the data packet, the printing apparatus 102 performs print processing on a recording medium (e.g., a sheet) according to its own print processing procedure.

As another data transfer method, the data can be transferred to the image interface board 211 via the encoding unit 203 and then can be output via the connector 216. Further, the data can be transmitted to the printing apparatus 102 via the video cable 106. The method includes appropriately acquiring information about power source state and startup state (normal/abnormal) of the server 101 and the printing apparatus 102. The information processing apparatus 104 sends a data packet to the server 101 based on the acquired information about power source state and startup state.

The method includes periodically performing polling to acquire the information about power source state and startup state of the server 101 and the printing apparatus 102 at predetermined time intervals. The information processing apparatus 104 acquires a state change notification packet sent from the server 101 and the printing apparatus 102 and changes the processing content thereof. As an example, if the information processing apparatus 104 receives a power source shutdown notification packet from the printing apparatus 102, the polling can be interrupted in such a way as to prevent the network from being used uselessly.

<Configuration of Printing Apparatus>

A configuration example of the printing apparatus 102 according to the first exemplary embodiment of the present invention is described in detail below with reference to FIG. 3.

The printing apparatus 102 includes a plurality of sheet holding units. Each of the plurality of sheet holding units can be a sheet holding unit (or a sheet feeding tray) 322 or a manual tray 327. For example, the plurality of sheet holding units can be constituted by a combination of sheet holding units 322 and a manual tray 327. In the present exemplary embodiment, the printing apparatus 102 includes eight sheet holding units (sheet feeding trays) 322 and a single manual tray 327.

Each sheet holding unit 322 includes a size detection sensor 325 that can detect the size of sheets stored in the sheet holding unit 322 and an open/shut detection sensor 326 that can detect an open/shut operation for the sheet holding unit 322. The printing apparatus 102 can further include a sensor capable of detecting the remaining amount of sheets stored in each sheet holding unit 322 and a sensor capable of detecting characteristics (e.g., color and surface nature) of sheets stored in each sheet holding unit 322. The size of sheets stored in the sheet holding unit can be acquired by accepting a user operation via the operation unit 318 of the printing apparatus 102. Alternatively, the size of sheets stored in the shut sheet holding unit can be imported from an external apparatus (e.g., the information processing apparatus 104).

On the other hand, the manual tray 327 includes a sensor (not illustrated) capable of detecting the presence of a sheet placed on the manual tray 327. Further, the manual tray 327 is different from the sheet holding unit 322 in that the size of each sheet cannot be determined unless the sheet is fed from the manual tray 327. Therefore, before the sheet is fed from the manual tray 327, the sheet size is determined by accepting size information input by a user via the operation unit 318 of the printing apparatus 102. Alternatively, the size of each sheet stored in the manual tray 327 can be imported from an external apparatus (e.g., the information processing apparatus 104).

The printing apparatus 102 is connected to a scanner 320 (i.e., an image input device) and a printer engine 301 (i.e., an image output device). The printing apparatus 102 can control image data reading and printing operations. Further, the printing apparatus 102 can perform control to input and output image information and device information via the network or the video cable, in a state where the printing apparatus 102 is connected to the network, the video cable, or a telephone line.

A central processing unit (CPU) 302 can control various operations to be performed by the printing apparatus 102. A random access memory (RAM) 303 is functionally operable as a system work memory for the CPU 302 or an image memory that temporarily stores input image data. Further, a read only memory (ROM) 307 is a boot ROM that stores a system boot program. A hard disk drive (HDD) 308 can store system software applications and input image data that are necessary to perform various processing described below. Further, the HDD 308 can store setting information input via the operation unit 318, setting information received from the server 101, and attribute information (e.g., size) of sheets stored in the sheet holding unit 322 or the manual tray 327. However, instead of using the HDD 308, it is useful to store the system software applications and input image data required to perform various processing in a nonvolatile memory, such as an SSD.

An operation unit I/F 304 is an interface unit configured to output operation screen data to the operation unit 318 that has an image data display screen. Further, the operation unit I/F 304 is functionally operable to transmit information, if input by a user via the operation unit 318, to the CPU 302. The operation unit 318 includes a touch panel unit and a key input unit although not illustrated. The operation unit 318 provides various interfaces that are usable to perform various settings and operations for the printing apparatus 102 according to the first exemplary embodiment.

A network I/F 305 can perform information input/output processing with an external apparatus via a network. The network I/F 305 can be realized, for example, by a LAN card. Alternatively, a wireless LAN is usable to perform the information input/output processing between the printing apparatus 102 and the external apparatus, if a wired network (e.g., LAN or WAN) is unavailable. A modem 306 can perform information input/output processing with an external apparatus via the telephone line. A video I/F 324 can perform information input/output processing with an external apparatus via the video cable.

The above-mentioned functional units are mutually connected via a system bus 323.

An image bus I/F 309 is an interface that connects the system bus 323 to an image bus 319 and operates as a bus bridge having a data structure conversion capability. The image bus 319 can speedily transfer image data. A raster image processor (RIP) 311, a device I/F 312, a scanner image processing unit 313, a printer image processing unit 314, and an image editing processing unit 315 are connected to each other via the image bus 319.

The RIP 311 is a raster image processor that can rasterize a page description language (PDL) as a raster image. The device I/F 312 can transfer image data, if it is input from the scanner 320, to the HDD 308. Further, the device I/F 312 can transfer image data to the printer engine 301. However, instead of using the device I/F 312, it can be configured to transfer image data, if it is input from the scanner 320, to the HDD 308 according to an instruction from the CPU 302. Similarly, instead of using the device I/F 312, it can be configured to transfer the image data to the printer engine 301 according to an instruction from the CPU 302.

The scanner image processing unit 313 can perform various (including correction) processing on image data, if it is input from the scanner 320. The printer image processing unit 314 can perform various (e.g., correction and resolution conversion) processing on image data to be printed out with reference to the capabilities of the printer engine 301. The image editing processing unit 315 can perform various (e.g., rotation and compression/decompression) image processing on image data.

A switch 317 is operable to input operational (e.g., power source startup and shutdown) instructions. When the switch 317 is operated, a power source control unit 316 transmits an interrupt signal to the CPU 302. The CPU 302 controls the power source control unit 316 according to an operational state in response to the interrupt signal.

A sheet holding unit control unit 321 is a module that can store a setting value of sheet attribute information for the sheet holding unit 322 or the manual tray 327 and can control a sheet feeding operation. The printing apparatus 102 can control a printing operation based on the sheet attribute information stored as the setting value for the sheet holding unit 322 or the manual tray 327. The sheet attribute information includes, for example, sheet size, sheet grammage, sheet color, and sheet type.

For example, the printing apparatus 102 determines an appropriate sheet holding unit 322 or the manual tray 327 to be used in a printing operation based on the size of sheets to be used for a print job and controls the determined sheet holding unit 322 or the manual tray 327 to perform a sheet feeding operation. Further, the printing apparatus 102 controls sheet conveyance speed or fixing device temperature based on sheet grammage or sheet type. The sheet holding unit control unit 321 acquires information relating to the open/shut operation of the sheet holding unit 322 from the open/shut detection sensor 326 and detects whether a sheet holding unit 322 being in an opened state has been shut.

Figure 4:
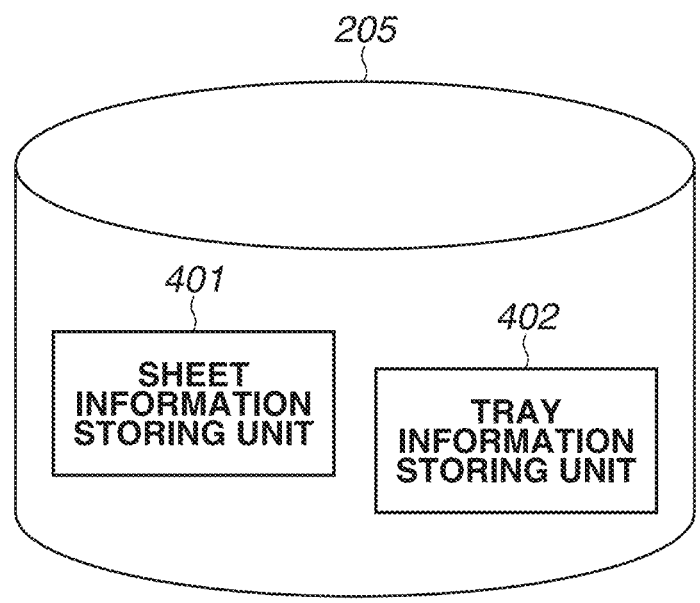
FIG. 4 illustrates data stored in an HDD unit of the server according to the first exemplary embodiment.

In the exemplary embodiment of the present invention, the sheet information storing unit 401 and the tray information storing unit 402 are stored as independent storage areas in the HDD unit 205 of the server 101 as illustrated in FIG. 4. As another exemplary embodiment, the HDD 308 of the printing apparatus 102 can be configured to have storage areas that are comparable to the above-mentioned storage areas of the HDD unit 205 of the server 101. Further, as another exemplary embodiment, the information processing apparatus 104 can be configured to have comparable storage areas in a nonvolatile memory thereof (not illustrated). In such a case, the data stored in the sheet information storing unit 401 and the tray information storing unit 402 can be referred to via the network 103.

The sheet information storing unit 401 can store sheet attribute information registered by a user, as an attribute information table 602 in a list format illustrated in FIG. 6A. The sheet attribute information registered in the sheet information storing unit 401 includes, for example, ID, sheet name, sheet size, sheet grammage, sheet color, and sheet type. Further, for example, registration target sheets in the sheet information storing unit 401 include printer maker evaluated sheets and user-definition sheets customized by a user based on standard sheets and evaluated sheets, in addition to ordinarily used sheets. Exemplary processing for registering sheet attribute information in the sheet information storing unit 401 is described in detail below with reference to FIG. 5.

On the other hand, the tray information storing unit 402 includes an attribute information table 1100 in a list format illustrated in FIG. 11, in which attribute information is registered in association with each sheet holding unit 322 and the manual tray 327. Each sheet registered in association with the sheet holding unit 322 or the manual tray 327 in the tray information storing unit 402 is a desired sheet frequently used by a user. Exemplary processing for registering sheet attribute information in association with each tray in the tray information storing unit 402 is described in detail below with reference to FIG. 7.

The system according to the first exemplary embodiment enables a user to select an arbitrary sheet holding unit 322 and manual tray 327 on a registration screen to designate a sheet attribute information registration target in the tray information storing unit 402 provided in the HDD unit 205 of the server 101. Then, the system registers sheet attribute information in association with the selected sheet holding unit 322 or the manual tray 327 in the tray information storing unit 402. The sheet feeding trays and the manual tray provided in the printing apparatus (which may be referred to as sheet management system) are hereinafter collectively referred to as "trays."

Then, the user stores sheets in the selected tray. Attribute information about the identified sheet can be automatically set as tray setting value by uniquely identifying sheet attribute information registered in the tray information storing unit 402, as described below. The sheet attribute information to be set as tray setting value is provisionally stored, as tray setting value, in the HDD 308. The tray setting value can be fixed when the user performs a fixing operation on the operation unit 318 of the printing apparatus 102. The fixed setting value is stored in the HDD 308.

First, processing for registering sheet attribute information in the sheet information storing unit 401 is described in detail below with reference to a flowchart illustrated in FIG. 5. The server 101 can perform processing illustrated in FIG. 5, FIG. 7, FIG. 8, and FIGS. 15 to 17. To carry out the above-mentioned processing, the CPU 207 of the server 101 executes a program loaded from the HDD 205 and developed into the second memory unit 208.

Although the server 101 performs the above-mentioned processing in the exemplary embodiment of the present invention, the printing apparatus 102 can perform similar processing. When the printing apparatus 102 performs the above-mentioned processing, the CPU 302 executes a program loaded from the HDD 308 and developed into the RAM 303. On the other hand, in a case where the information processing apparatus 104 is functionally operable as the server 101, the information processing apparatus 104 can perform similar processing.

In step S501, the CPU 207 determines whether a registration screen 600 illustrated in FIG. 6A has been called. The registration screen 600 illustrated in FIG. 6A can be displayed on the operation unit 209 of the server 101. The sheet attribute information includes, for example, ID, sheet name, sheet size, sheet grammage, sheet color, and sheet type. The sheet attribute information can be registered in a list format via the registration screen 600.

If the CPU 207 determines that the registration screen 600 has been called (YES in step S501), the operation proceeds to step S502. Otherwise, the CPU 207 repeats the processing in step S501 until the registration screen 600 is called.

In step S502, the CPU 207 displays the registration screen 600 on the operation unit 209 of the server 101 to accept each pressing of the addition button 601 on the registration screen 600. Subsequently, the operation proceeds to step S503.

In step S503, the CPU 207 displays an addition screen 610 illustrated in FIG. 6B on the operation unit 209 of the server 101. The CPU 207 acquires sheet attribute information (e.g., sheet name, size, grammage, color, and type) input by a user. Then, the operation proceeds to step S504. The attribute information (e.g., sheet name, size, grammage, color, and type) can be imported from an external apparatus, such as the information processing apparatus 104 or the printing apparatus 102.

In step S504, the CPU 207 determines whether a registration button 611 has been pressed on the addition screen 610 illustrated in FIG. 6B. If the CPU 207 determines that the registration button 611 has been pressed (YES in step S504), the operation proceeds to step S505. Otherwise, the CPU 207 repeats the processing in step S504 until the registration button 611 is pressed.

In step S505, the CPU 207 registers the sheet attribute information acquired in step S503 in the sheet information storing unit 401 of the HDD unit 205 provided in the server 101. Then, after completing the processing in step S505, the CPU 207 terminates line of processing for registering the sheet attribute information in the sheet information storing unit 401.

As mentioned above, the server 101 performs the line of processing for registering the sheet attribute information in the sheet information storing unit 401. The printing apparatus 102 can perform similar processing comparable to the above-mentioned registration processing performed by the server 101. More specifically, in performing the above-mentioned registration processing, "the CPU 302", "the operation unit 318", and "the HDD 308" of the printing apparatus 102 are functionally comparable to "the CPU 207", "the operation unit 209", and "the HDD unit 205" of the server 101.

Subsequently, processing for simultaneously registering sheet attribute information in association with each tray in the tray information storing unit 402 is described in detail below with reference to a flowchart illustrated in FIG. 7.

In step S701, the CPU 207 determines whether a registration screen 900 illustrated in FIG. 9A has been called on the operation unit 209 of the server 101. If the CPU 207 determines that the registration screen 900 has been called (YES in step S701), the operation proceeds to step S702. Otherwise, the CPU 207 repeats the processing in step S701 until the registration screen 900 is called.

In step S702, the CPU 207 displays the registration screen 900 illustrated in FIG. 9A on the operation unit 209 of the server 101. Then, the operation proceeds to step S703.

In step S703, the CPU 207 determines whether there is any event having occurred on the registration screen 900 illustrated in FIG. 9A. If the CPU 207 determines that an event has occurred (YES in step S703), the operation proceeds to step S704. Otherwise, the CPU 207 repeats the processing in step S703 until any event occurs.

In step S704, the CPU 207 determines whether the occurrence event identified in step S703 is an event of pressing a registration button 904 on the registration screen 900 illustrated in FIG. 9A. If the CPU 207 determines that the identified occurrence event is not the event of pressing the registration button 904 (NO in step S704), the operation proceeds to step S705.

In step S705, the CPU 207 determines whether the occurrence event identified in step S703 is an event of pressing an addition button 902 on the registration screen 900 illustrated in FIG. 9A. If the CPU 207 determines that the identified occurrence event is the event of pressing the addition button 902 (YES in step S705), the operation proceeds to step S706.

In step S706, the CPU 207 displays a selection screen 1000 illustrated in FIG. 10 on the operation unit 209 to enable a user to select a registration target sheet to be added in association with the sheet holding unit 322 or the manual tray 327 from the sheets registered in the sheet information storing unit 401. Then, the operation proceeds to step S707.

In step S707, the CPU 207 acquires attribute information about arbitrary sheet having been selected by a user on the selection screen 1000 from the sheets registered in the sheet information storing unit 401. Then, the operation proceeds to step S708. For example, the sheet attribute information acquired in step S707 is a combination including at least one of sheet size, sheet grammage, sheet color, and sheet type. After the sheet attribute information is acquired in step S707, a part of the acquired attribute information (e.g., sheet size, grammage, color, or type) can be changed if desired. Further, the attribute information (e.g., sheet size, grammage, color, and, and type) can be imported from an external apparatus, such as the information processing apparatus 104 or the printing apparatus 102.

In step S708, the CPU 207 adds the sheet attribute information acquired in step S707 to the registration screen 900 illustrated in FIG. 9A.

For example, A4-sized "A. Corporation Custom" sheet 911, A4-sized "My Paper" sheet 912, and A3-sized "Paper 2" sheet 913 are displayed on the registration screen 900 illustrated in FIG. 9A. It is now presumed that the user presses the addition button 902 on the registration screen 900 illustrated in FIG. 9A to display the selection screen 1000 illustrated in FIG. 10 on the operation unit 209 of the server 101. Then, the user selects a sheet having sheet attribute information "name: A. Corporation Media 2, size: A4, grammage: 80 g/m$^2$, color: Yellow, and type: coated paper" on the selection screen 1000. The sheet attribute information acquired in such a case is "name: A. Corporation Media 2, size: A4, grammage: 80 g/m$^2$, color: Yellow, and type: coated paper." As understood from the registration screen 900 illustrated in FIG. 9B, the acquired attribute information about "A. Corporation Media 2" sheet 914 is additionally displayed.

After completing the processing in step S708, the operation returns to step S703 and the CPU 207 performs the above-mentioned processing again.

On the other hand, if the determination result in step S705 is NO, the operation of the CPU 207 proceeds to step S709.

In step S709, the CPU 207 determines whether the occurrence event identified in step S703 is an event of pressing a selection button 901 on the registration screen 900 illustrated in FIG. 9A. If the CPU 207 determines that the identified occurrence event is the event of pressing the selection button 901 (YES in step S709), the operation proceeds to step S710.

In step S710, the CPU 207 designates the sheet holding unit 322 or the manual tray 327 having been selected by the pressing of the selection button 901 as sheet attribute information registration target. For example, as understood from the registration screen 900 illustrated in FIG. 9A, sheet feeding trays Tray 1, Tray 2, and Tray 3 are designated as registration targets of attribute information about "A. Corporation Custom" sheet 911. On the other hand, the manual tray is designated as a registration target of attribute information about "My Paper" sheet 912. Further, all trays (more specifically, sheet feeding trays Tray 1, Tray 2, Tray 3, Tray 4, Tray 5, Tray 6, Tray 7, and Tray 8 and the manual tray) are designated as registration targets of attribute information about "Paper 2" sheet 913. After completing the processing in step S710, the operation returns to step S703 and the CPU 207 performs the above-mentioned processing again.

On the other hand, if the determination result in step S709 is NO, the operation of the CPU 207 proceeds to step S711. In step S711, the CPU 207 performs another processing according to a user operation. The processing to be performed in step S711 is, for example, processing for deleting the registration of a sheet attribute information registration target tray when a user presses a deletion button 903 on the registration screen 900 illustrated in FIG. 9A. After completing the processing in step S711, the operation returns to step S703 and the CPU 207 performs the above-mentioned processing again.

On the other hand, if the CPU 207 determines that the occurrence event identified in step S703 is the event of pressing the registration button 904 on the registration screen 900 illustrated in FIG. 9A (YES in step S704), the operation proceeds to step S712.

In step S712, the CPU 207 determines whether a plurality of sheets having the same size is to be registered in association with the same tray. In the tray information storing unit 402, it is restricted to register a plurality of sheets having the same size in association with the same tray. The reason why the above-mentioned registration is prohibited is because uniquely identifying a sheet registered in association with each tray in the tray information storing unit 402 is feasible by referring to the size information about sheets stored in the sheet holding unit 322 or in the manual tray 327.

For example, in the attribute information table 1100 illustrated in FIG. 11, a sheet having sheet attribute information "name: A. Corporation Custom, size: A4, grammage 62 g/m$^2$, color: Red, and type: plain paper" is already registered for the sheet feeding tray Tray 1. Therefore, another sheet having sheet attribute information "name: A. Corporation Media 2, size: A4, grammage 80 g/m$^2$, color: Yellow, and type: coated paper" cannot be additionally registered for the sheet feeding tray Tray 1 because associating a plurality of A4-sized sheets with the same sheet feeding tray Tray 1 is prohibited.

In the present exemplary embodiment, the size detection sensor 325 equipped in each sheet holding unit 322 can detect the size of each sheet. Further, it is feasible to acquire size information by accepting an input indicating the size of sheets stored in the manual tray 327 from a user. Therefore, in the tray information storing unit 402, it is restricted to register a plurality of sheets having the same size in association with the same sheet holding unit 322 or the manual tray 327, as described above.

On the other hand, the sensor provided in the sheet holding unit 322 may be able to detect other characteristics (e.g., color, grammage, or type) of each sheet and it may be feasible to accept a user instruction indicating characteristics (e.g., color, grammage, or type) of sheets stored in the manual tray 327. In such a case, it is feasible to perform similar restrictive processing using the acquired sheet characteristics. More specifically, in the tray information storing unit 402, it may be useful to restrict a plurality of sheets having the same characteristics (e.g., color, grammage, or type) from been registered in association with the same tray.

If the CPU 207 determines that a plurality of sheets having the same size is to be registered in association with the same tray (YES in step S712), the operation proceeds to step S800.

Subsequently, processing for changing the sheet attribute information registration target tray (i.e., the processing to be performed in step S800) is described in detail below with reference to a flowchart illustrated in FIG. 8.

In step S801, the CPU 207 displays a warning screen 1200 illustrated in FIG. 12A on the operation unit 209 of the server 101. Then, the operation proceeds to step S802. The warning screen 1200 is a screen that lets a user change the sheet attribute information registration target tray because registering attribute information about a plurality of sheets having the same size in association with the same tray is prohibited.

In step S802, the CPU 207 determines whether there is any event having occurred on the warning screen 1200. If the CPU 207 determines that an event has occurred (YES in step S802), the operation proceeds to step S803. Otherwise, the CPU 207 repeats the processing in step S802 until any event occurs.

In step S803, the CPU 207 determines whether the occurrence event identified in step S802 is an event of pressing a change button 1201 on the warning screen 1200. If the CPU 207 determines that the identified occurrence event is the event of pressing the change button 1201 (YES in step S803), the operation proceeds to step S805. On the other hand, if the determination result in step S803 is NO, the operation of the CPU 207 proceeds to step S804.

In step S804, the CPU 207 determines whether the occurrence event identified in step S802 is an event of pressing a cancel button 1202. If it is determined that the identified occurrence event is the event of pressing the cancel button 1202 (YES in step S804), the CPU 207 terminates the processing for changing the sheet attribute information registration target tray (i.e., the processing to be performed in step S800). Then, the operation returns to step S712 illustrated in FIG. 7 and the CPU 207 performs the above-mentioned processing again. On the other hand, if the determination result in step S804 is NO, the operation returns to step S802 and the CPU 207 performs the above-mentioned processing again.

In step S805, the CPU 207 displays a change screen 1210 illustrated in FIG. 12B on the operation unit 209 of the server 101. Then, the operation proceeds to step S806.

In step S806, the CPU 207 determines whether there is any event having occurred on the change screen 1210. If the CPU 207 determines that an event has occurred (YES in step S806), the operation proceeds to step S807. Otherwise, the CPU 207 repeats the processing in step S806 until any event occurs.

In step S807, the CPU 207 determines whether the occurrence event identified in step S806 is an event of pressing an OK button 1212 on the change screen 1210. If the CPU 207 determines that the identified occurrence event is the event of pressing the OK button 1212 (YES in step S807), the CPU 207 terminates the processing for changing the sheet attribute information registration target tray (i.e., the processing to be performed in step S800). The operation returns to step S712 illustrated in FIG. 7 and the CPU 207 performs the above-mentioned processing again. On the other hand, if the determination result in step S807 is NO, the operation of the CPU 207 proceeds to step S808.

In step S808, the CPU 207 determines whether the occurrence event identified in step S806 is an event of pressing a selection button 1211 on the change screen 1210. If the CPU 207 determines that the identified occurrence event is the event of pressing the selection button 1211 (YES in step S808), the operation proceeds to step S809.

In step S809, the CPU 207 designates the sheet holding unit 322 or the manual tray 327 having been selected by the pressing of the selection button 901 as sheet attribute information registration target. Then, the operation returns to step S806 and the CPU 207 performs the above-mentioned processing again. For example, as understood from the change screen 1210 illustrated in FIG. 12B, it is feasible to change the registration target tray for attribute information about the A4-sized "A. Corporation Custom" sheet 911. Similarly, the registration target tray for attribute information about the A4-sized "A. Corporation Media 2" sheet 914 can be changed on the change screen 1210.

Figure 7:
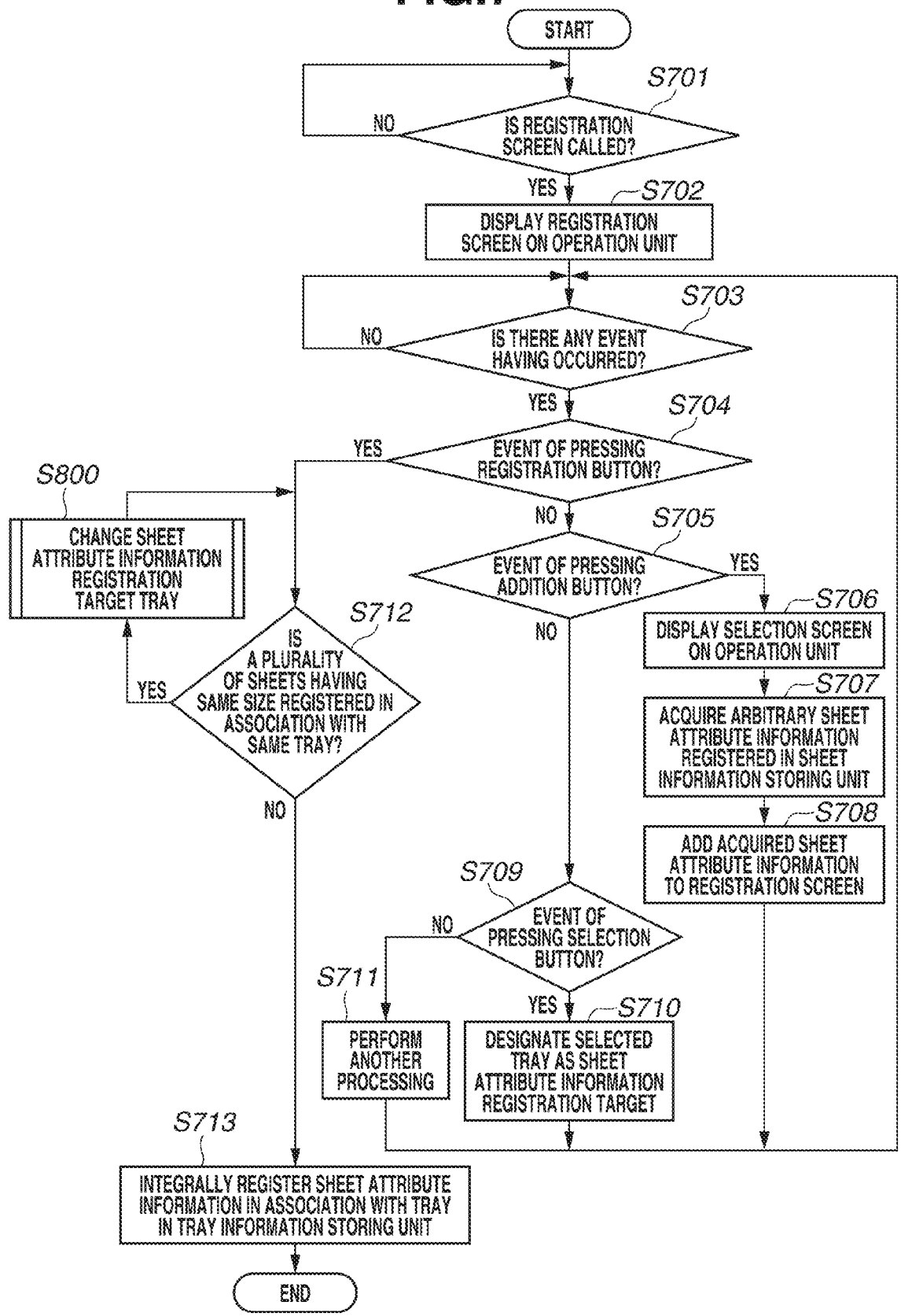
FIG. 7 is a flowchart illustrating exemplary processing for simultaneously registering sheet attribute information in association with each tray in a tray information storing unit, which can be performed by the server according to the first exemplary embodiment.

On the other hand, if the determination result in step S712 illustrated in FIG. 7 is NO, the operation of the CPU 207 proceeds to step S713.

In step S713, the CPU 207 performs batch registration of sheet attribute information in association with the tray designated in step S710 or in step S809 in the tray information storing unit 402. Then, the CPU 207 terminates the line of processing of the flowchart illustrated in FIG. 7.

Subsequently, processing for performing batch registration of sheet attribute information in association with each tray in the tray information storing unit 402 is described in detail below. For example, as understood from the registration screen 900 illustrated in FIG. 9A, the sheet feeding trays Tray 1, Tray 2, and Tray 3 are designated as registration targets of the attribute information about A4-sized "A. Corporation Custom" sheet 911. On the other hand, the manual tray is designated as registration target of the attribute information about A4-sized "My Paper" sheet 912. Further, all trays are designated as registration target of attribute information about A3-sized "Paper 2" sheet 913.

More specifically, the determination result in step S712 becomes NO because a plurality of sheets having the same size is not registered in association with the same tray. Then, in step S713, the CPU 207 simultaneously registers the sheet attribute information "A. Corporation Custom", "My Paper", and "Paper 2" in association with the sheet holding unit 322 or the manual tray 327 in the tray information storing unit 402, as illustrated in the attribute information table 1100.

On the other hand, as understood from the registration screen 900 illustrated in FIG. 9B, sheet feeding trays Tray 1 and Tray 5 are designated as registration targets of attribute information about the A4-sized "A. Corporation Media 2" sheet 914. More specifically, a plurality of sheets (i.e., the "A. Corporation Custom" sheet and the "A. Corporation Media 2" sheet) having the same size (A4 size) is to be registered in association with the same tray (i.e., sheet feeding tray Tray 1). Therefore, the determination result in step S712 becomes YES. Thus, the warning screen 1200 illustrated in FIG. 12A is displayed on the operation unit 209 of the server 101 and the change screen 1210 illustrated FIG. 12B is called.

The user can delete the sheet feeding tray Tray 1 being designated as registration target of the attribute information about "A. Corporation Media 2" sheet 914 on the change screen 1210 illustrated in FIG. 12B. The determination result in step S712 becomes NO. Further, in step S713, the CPU 207 simultaneously registers the sheet attribute information in association with each tray in the tray information storing unit 402, as understood from an attribute information table 1300 illustrated in FIG. 13.

As mentioned above, the server 101 according to the first exemplary embodiment can perform line of processing for simultaneously registering sheet attribute information in association with each tray in the tray information storing unit 402 provided in the HDD unit 205 of the server 101.

The printing apparatus 102 can perform similar processing comparable to the above-mentioned processing performed by the server 101. More specifically, in performing the above-mentioned processing, "the CPU 302", "the HDD 308", and "the operation unit 318" of the printing apparatus 102 are functionally comparable to "the CPU 207", "the HDD unit 205", and "the operation unit 209" of the server 101.

In the above-mentioned exemplary embodiment, it is feasible to designate the same tray as sheet attribute information registration target on the registration screen 900 illustrated in FIG. 9A even if a plurality of sheets having the same size is to be registered in association with the same tray. However, the above-mentioned processing can be modified appropriately. For example, it is useful to prevent the same tray from being designated as sheet attribute information registration target on the registration screen 900 illustrated in FIG. 9A, in such a way as to prevent a plurality of sheets having the same size from being registered in association with the same tray.

For example, if the sheet feeding tray Tray 1 is already designated as sheet attribute information registration target of the "A. Corporation Custom" sheet 911 on the registration screen 900 illustrated in FIG. 9A, designating the sheet feeding tray Tray 1 as sheet attribute information registration target of the "My Paper" sheet 912 is restricted unless the designation of the "A. Corporation Custom" sheet 911 is deleted.

Subsequently, line of processing for setting sheet attribute information as sheet feeding tray setting value or manual tray setting value, which can be performed by the printing apparatus 102 according to the first exemplary embodiment, is described in detail below with reference to a flowchart illustrated in FIG. 14. To carry out the above-mentioned processing, the CPU 302 of the printing apparatus 102 executes a program loaded from the HDD 308 and developed into the RAM 303.

First, in step S1401, the CPU 302 determines whether a sheet storage target is the sheet feeding tray or the manual tray. In a case where the opening of a sheet feeding tray is detected based on information acquired from the open/shut detection sensor 326 illustrated in FIG. 3, the CPU 302 can determine that the sheet storage target is the sheet feeding tray. On the other hand, if the switching from a sheet non-existent state to a sheet existent state of the manual tray is detected based on information acquired from a sensor (not illustrated) provided in the manual tray, the CPU 302 can determine that the sheet storage target is the manual tray.

If in step S1401 the CPU 302 determines that the sheet storage target is the sheet feeding tray, the operation proceeds to step S1402.

In step S1402, the CPU 302 determines whether an opened-state sheet feeding tray has been shut. In step S1402, it is presumed that a user opens a sheet feeding tray to be used to store a sheet for the execution of a job and then shuts the opened-state sheet feeding tray after the user stores the sheet in the opened tray. The information acquired from the open/shut detection sensor 326 is usable to determine whether the opened-state sheet feeding tray has been shut.

If the CPU 302 determines that the sheet feeding tray has been shut (YES in step S1402), the operation proceeds to step S1403. Otherwise, the CPU 302 repeats the processing in step S1402 until the sheet feeding tray is shut.

Figure 3:
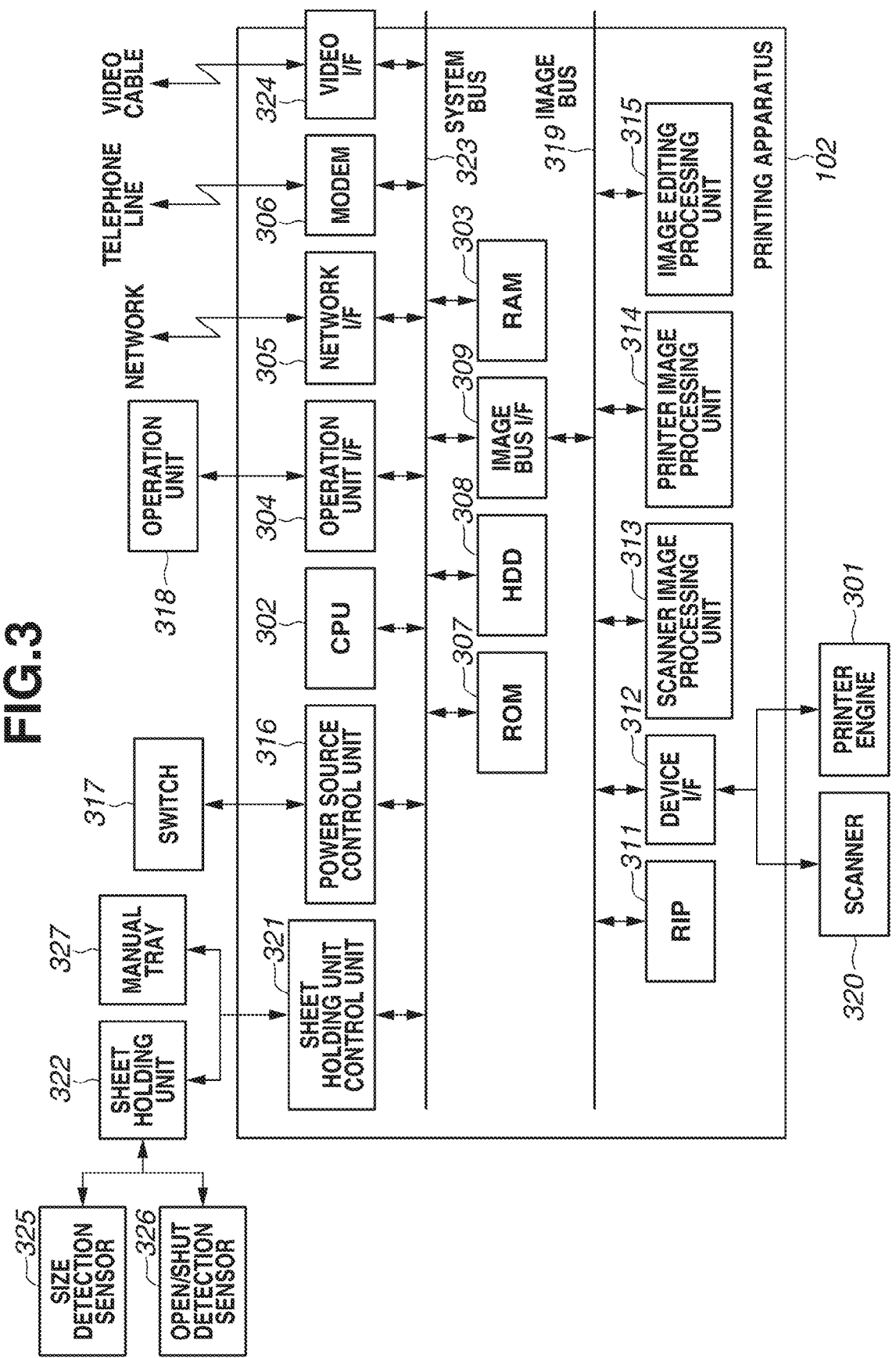
FIG. 3 is a block diagram illustrating a printing apparatus according to the first exemplary embodiment.

In step S1403, the CPU 302 causes the size detection sensor 325 illustrated in FIG. 3 to detect (acquire) the size of sheets stored in the shut sheet feeding tray. Then, the operation proceeds to step S1404.

In step S1404, the CPU 302 transmits information required to identify the shut sheet feeding tray (e.g., a serial number allocated to each sheet feeding tray) and the sheet size detected (acquired) in step S1403 to the server 101 via the network 105. Then, the operation proceeds to step S1407. The information required to identify the shut sheet feeding tray is information required to identify a search target sheet feeding tray in searching for a sheet registered in association with the paper feeding tray in the tray information storing unit 402. Further, the size of sheets stored in the sheet feeding tray is information required to uniquely identify a sheet from the sheets registered in association with the search target paper feeding tray. The information to be transmitted by the printing apparatus 102 in step S1404 can be received by the server 101 in step S1501 illustrated in FIG. 15.

On the other hand, if in step S1401 the CPU 302 determines that the sheet storage target is the manual tray, the operation proceeds to step S1405.

In step S1405, the CPU 302 determines whether size information has been acquired based on a user instruction indicating the size of the sheet stored in the manual tray accepted via the operation unit 318 of the printing apparatus 102. If the CPU 302 determines that the size information has been accepted (YES in step S1405), the operation proceeds to step S1406. Otherwise, the CPU 302 repeats the processing in step S1405 until the size information is accepted.

In step S1406, the CPU 302 transmits the information required to identify the manual tray in which sheet has been stored and for which the sheet size has been input, together with the sheet size acquired in step S1405, to the server 101 via the network 105. Then, the operation proceeds to step S1407. The information required to identify the manual tray is, for example, the number designated to each manual tray or the name of each manual tray in a case where the printing apparatus 102 includes a plurality of manual trays.

The information required to identify the sheet size input manual tray is information required to identify a search target manual tray in searching for a sheet registered in association with the manual tray in the tray information storing unit 402. Further, the size of a sheet in the manual tray is information required to uniquely identify each sheet when a plurality of sheets is registered in association with the search target manual tray. The information to be transmitted by the printing apparatus 102 in step S1406 can be received by the server 101 in step S1501 illustrated in FIG. 15.

In step S1407, the CPU 302 determines whether there is any response received from the server 101 via the network 105 after completing the transmission of the information required to identify the shut sheet feeding tray or the sheet size input manual tray and the sheet size to the server 101. The information to be received by the printing apparatus 102 in step S1407 can be transmitted by the server 101 in step S1505 illustrated in FIG. 15.

If the CPU 302 determines that a response has been received (YES in step S1407), the operation proceeds to step S1408. Otherwise, the CPU 302 repeats the processing in step S1407 until a response is received. If a predetermined time has elapsed without receiving any response from the server 101, the CPU 302 can perform time-out processing. Namely, the CPU 302 does not set any sheet attribute information as shut sheet feeding tray setting time or sheet size input manual tray setting value. In this case, the CPU 302 can notify a user of the time-out result by displaying an appropriate indication or message on the operation unit 318 of the printing apparatus 102.

Further, in response to the time-out result, it is useful to let a user operate the operation unit 318 of the printing apparatus 102 to input arbitrary sheet attribute information that can be set as shut sheet feeding tray setting value or sheet size input manual tray setting value. Alternatively, it is useful to acquire and set default sheet attribute information (e.g., "size: A4, grammage: 70 g/m$^2$, color: White, and type: "plain paper") as shut sheet feeding tray setting value or sheet size input manual tray setting value.

In step S1408, the CPU 302 determines whether sheet attribute information (e.g., sheet size, grammage, color, and type) has been received from the server 101 via the network 105. The information to be received by the printing apparatus 102 in step S1408 can be transmitted by the server 101 in step S1504 illustrated in FIG. 15.

If the CPU 302 determines that the sheet attribute information has been received (YES in step S1408), the operation proceeds to step S1409. On the other hand, if the determination result in step S1408 is NO, the CPU 302 terminates the processing for setting the uniquely identified sheet attribute information as setting value of the sheet holding unit 322 or the manual tray 327. In this case, the CPU 302 can notify a user that the above-mentioned processing result has been terminated without receiving any sheet attribute information from the server 101 by displaying an appropriate indication or message on the operation unit 318 of the printing apparatus 102.

Further, in a case where no sheet attribute information is received from the server 101, it is useful to let a user operate the operation unit 318 to input arbitrary sheet attribute information that can be set as shut sheet feeding tray setting value or sheet size input manual tray setting value. Alternatively, it is useful to acquire and set default sheet attribute information (e.g., "size: A4, grammage: 70 g/m$^2$, color: White, type: and plain paper") as shut sheet feeding tray setting value or sheet size input manual tray setting value.

In step S1409, the CPU 302 sets the sheet attribute information received from the server 101 in step S1408 as shut sheet feeding tray setting value or sheet size input manual tray setting value. The sheet attribute information to be set as tray setting value in step S1409 can be provisionally stored as tray setting value in the HDD 308. Therefore, if the sheet attribute information having been set as tray setting value is not desirable for a user, it is useful to change the sheet attribute information to be set as tray setting value by accepting a user operation via the operation unit 318 of the printing apparatus 102. The user can perform an operation to fix the tray setting value on the operation unit 318 of the printing apparatus 102. The fixed tray setting value can be stored in the HDD 308.

After completing the processing in step S1409, the CPU 302 terminates the processing for setting the sheet attribute information as sheet feeding tray or manual tray setting value.

As mentioned above, the printing apparatus 102 according to the first exemplary embodiment can perform the line of processing for uniquely identifying a sheet with reference to the tray information storing unit 402 and setting attribute information of the identified sheet as sheet feeding tray setting value or manual tray setting value.

As mentioned above, the printing apparatus 102 detects (acquires) the size of sheets stored in the shut sheet feeding tray in response to a shutting operation of the sheet feeding tray and transmits the detected (acquired) sheet size to the server 101 and further performs the subsequent processing. However, the operation to be performed by the printing apparatus 102 is not limited to the above-mentioned example.

It is now presumed that detecting (acquiring) the size of each sheet stored in a sheet feeding tray is feasible even in a state where the sheet feeding tray is opened. In such a case, for example, it is useful to transmit the detected (acquired) sheet size to the server 101 in response to the elapse of a predetermined time since the opening of the sheet holding unit before performing the subsequent processing.

Alternatively, the operation unit 318 of the printing apparatus 102 can be configured to include a button that enables a user to transmit the size of sheets stored in the sheet holding unit to the server 101. In this case, the printing apparatus 102 can transmit the sheet size to the server 101 in response to each pressing of the above-mentioned button before performing the subsequent processing.

Next, sequential processing for searching for a sheet registered in the tray information storing unit 402, which can be performed by the server 101 according to the first exemplary embodiment, is described in detail below with reference to a flowchart illustrated in FIG. 15.

First, in step S1501, the CPU 207 receives the information required to identify the shut sheet feeding tray or the sheet size input manual tray and the sheet size from the printing apparatus 102 via the network 105. Then, the operation proceeds to step S1502. The information to be received by the server 101 in step S1501 can be transmitted by the printing apparatus 102 in step S1404 or step S1406 illustrated in FIG. 14.

In step S1502, the CPU 207 acquires information relating to the sheet registered in association with the identified sheet feeding tray or the manual tray, with reference to the tray information storing unit 402 provided in the HDD unit 205, based on the information received in step S1501 (i.e., the information required to identify the sheet feeding tray or the manual tray). Then, the CPU 207 determines whether there is at least one sheet registered in association with the identified sheet feeding tray or the manual tray. If the CPU 207 determines that there is at least one sheet (YES in step S1502), the operation proceeds to step S1503. On the other hand, if the determination result in step S1502 is NO, the operation of the CPU 207 proceeds to step S1505. In this case, the CPU 207 can transmit a response to the printing apparatus 102 via the network 105 to inform the non-presence of any sheet registered in association with the sheet feeding tray or the manual tray.

In step S1503, the CPU 207 determines whether there is any sheet having the same size as the sheets registered in association with the sheet feeding tray or the manual tray in the tray information storing unit 402, based on the sheet size received in step S1501.

If the CPU 207 determines that the above-mentioned sheet is registered (YES in step S1503), the operation proceeds to step S1504. On the other hand, if the determination result in step S1503 is NO, the operation of the CPU 207 proceeds to step S1505. In this case, the CPU 207 can transmit an appropriate response to the printing apparatus 102 via the network 105 to inform the non-registration of any sheet having the same size as the sheets stored in the sheet feeding tray or the manual tray.

In step S1504, the CPU 207 transmits the sheet attribute information (e.g., sheet size, grammage, color, and type) registered in association with the sheet feeding tray or the manual tray in the tray information storing unit 402 to the printing apparatus 102 via the network 105. The information to be transmitted by the server 101 in step S1504 can be received by the printing apparatus 102 in step S1408 illustrated in FIG. 14.

After completing the processing in step S1504, the operation proceeds to step S1505. The CPU 207 transmits a response informing the completion of the processing by the server 101 to the printing apparatus 102 via the network 105. The information to be transmitted by the server 101 in step S1505 can be received by the printing apparatus 102 in step S1407 illustrated in FIG. 14. After completing the processing in step S1505, the CPU 207 terminates the processing for searching for a sheet registered in the tray information storing unit 402.

As mentioned above, the server 101 according to the first exemplary embodiment can perform the line of processing for searching for a sheet registered in the tray information storing unit 402 provided in the HDD unit 205 of the server 101. The printing apparatus 102 can perform similar processing comparable to the above-mentioned processing performed by the server 101. More specifically, in performing the above-mentioned processing, "the CPU 302" and "the HDD 308" of the printing apparatus 102 are functionally comparable to "the CPU 207" and "the HDD unit 205" of the server 101.

As mentioned above, in the first exemplary embodiment, sheet attribute information is registered in association with each sheet feeding tray or the manual tray in the tray information storing unit 402 provided in the HDD unit 205 of the server 101.

When a user stores sheets in a sheet feeding tray and shuts the sheet feeding tray, the system according to the present exemplary embodiment can uniquely identify the sheet registered in association with the paper feeding tray in the tray information storing unit 402. The uniquely identified sheet attribute information can be automatically set as sheet feeding tray setting value.

When a user stores sheets in the manual tray and inputs the size of the sheets, the system can uniquely identify the sheet registered in association with the manual tray in the tray information storing unit 402. The uniquely identified sheet attribute information can be automatically set as manual tray setting value.

More specifically, in a case where frequently used sheets are stored in a plurality of trays (e.g., the sheet holding unit 322 and the manual tray 327), it is feasible to simultaneously and easily perform automatic setting of frequently used sheet attribute information as each tray setting value. Therefore, user convenience can be greatly improved.

Hereinafter, a second exemplary embodiment is described in detail below. In the above-mentioned first exemplary embodiment, when a user selects a desired sheet feeding tray (or manual tray), the system performs batch registration of sheet attribute information in association with the sheet feeding tray or the manual tray in the tray information storing unit 402, as described above.

For example, when a user selects each of the sheet feeding trays Tray 1, Tray 2, and Tray 3 on the registration screen 900 illustrated in FIG. 9A, the system can perform batch registration of attribute information about "A. Corporation Custom" sheet 911 in association with each paper feeding tray.

On the other hand, for example, in a case where the system requires a great amount of frequently used sheets to execute a job, the required sheets may not be entirely stored in a single tray. Therefore, it is necessary to store all of the required sheets in a plurality of trays beforehand to prevent the execution of the job from being interrupted. In such a case, instead of relying on a manual operation to select a registration target tray for the sheet attribute information, it may be useful to simultaneously register the sheet attribute information in association with a part of the trays provided in the printing apparatus 102, the number of which is designated by the user.

Therefore, the system according to the second exemplary embodiment provides a registration screen 1800 illustrated in FIG. 18A to accept a desired number of sheet attribute information batch registration target trays 1801 from each user. An upper-limit value acceptable as the number of trays 1801 is the total number of the trays provided in the printing apparatus 102. Further, the system is configured to search for sheet attribute information registerable trays and simultaneously register the sheet attribute information in association with each tray, according to the number of trays 1801 having been input by the user, as described in detail below.

In the second exemplary embodiment, processing for registering sheet attribute information in the sheet information storing unit 401 provided in the HDD unit 205 of the server 101 (or in the HDD 308 of the printing apparatus 102) can be performed according to a flowchart that is partly similar to the flowchart illustrated in FIG. 5 described in the first exemplary embodiment. Therefore, redundant description thereof will be avoided.

Further, in the printing apparatus 102, processing for uniquely identifying a sheet with reference to the tray information storing unit 402 and setting the attribute information of the identified sheet as sheet feeding tray setting value or manual tray setting value can be performed according to a flowchart that is similar to the flowchart illustrated in FIG. 14 described in the first exemplary embodiment. Therefore, redundant description thereof will be avoided.

Figure 15:
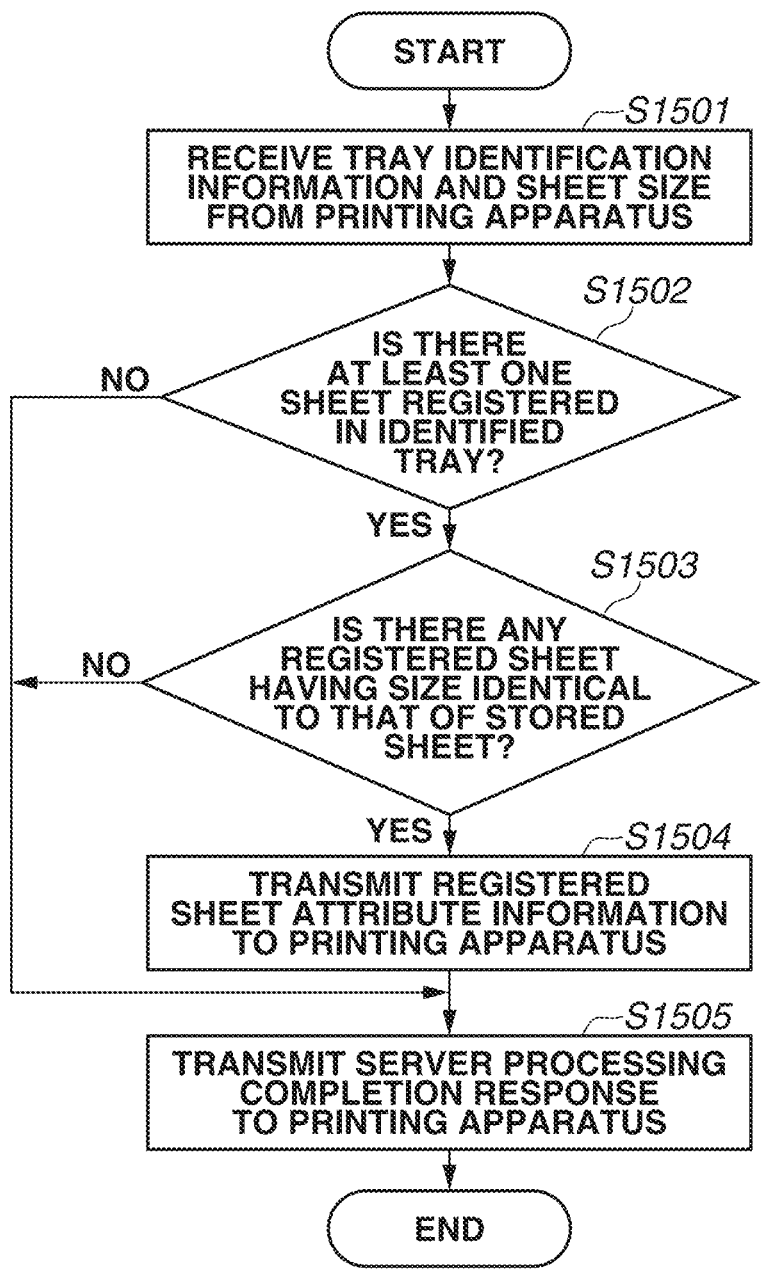
FIG. 15 is a flowchart illustrating exemplary processing for searching for a sheet registered in the tray information storing unit, which can be performed by the server according to the first exemplary embodiment.

Further, in the server 101 according to the second exemplary embodiment, processing for searching for a sheet registered in the tray information storing unit 402 can be performed by a flowchart that is similar to the flowchart illustrated in FIG. 15 described in the first exemplary embodiment. Therefore, redundant description thereof will be avoided.

On the other hand, in the server 101 according to the second exemplary embodiment, processing for simultaneously registering sheet attribute information in association with each tray in the tray information storing unit 402 can be performed according to a flowchart that is partly different from the flowchart illustrated in FIG. 7 described in the first exemplary embodiment. Therefore, only the different part of the processing will be described in detail below.

Figure 16:
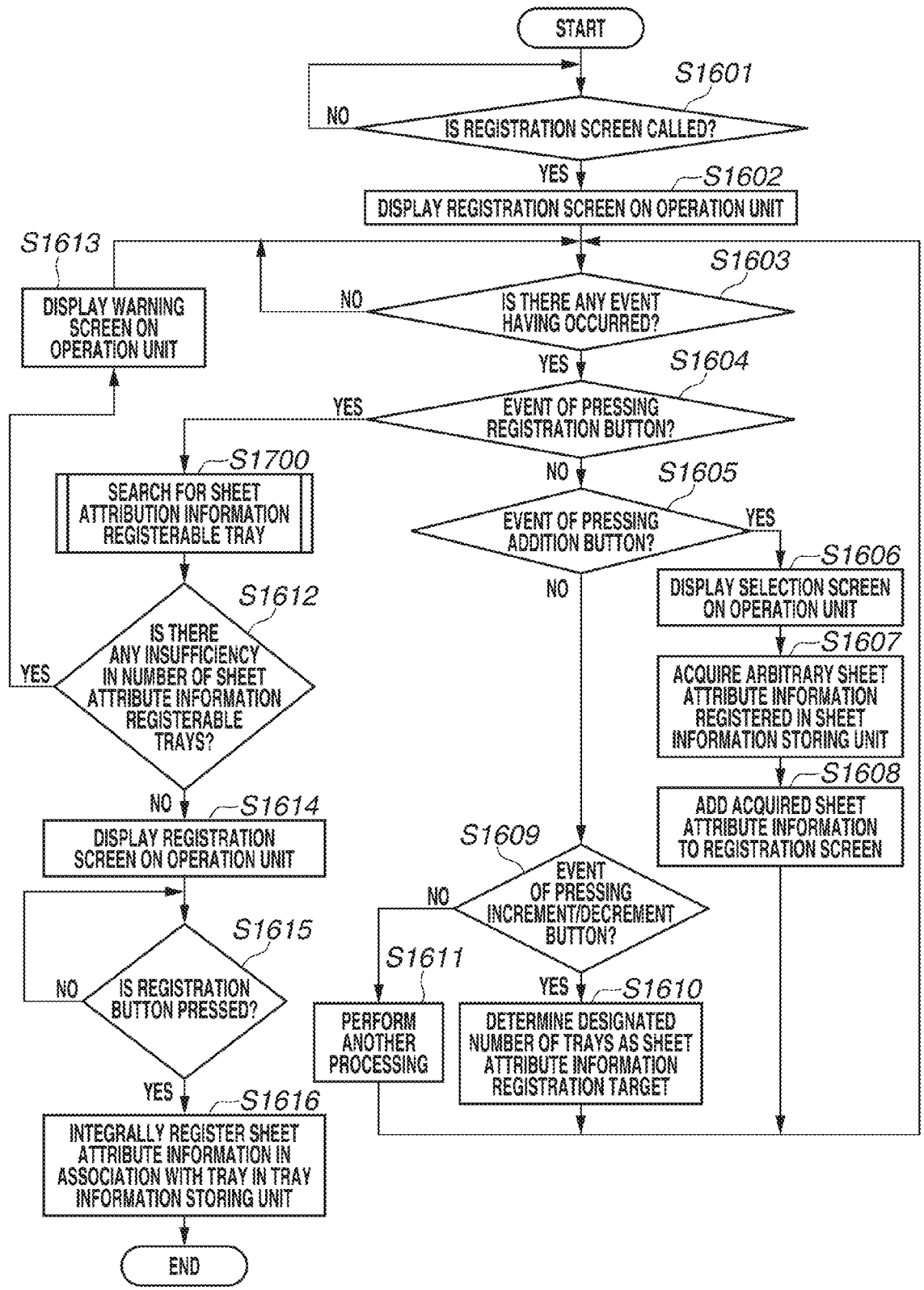
FIG. 16 is a flowchart illustrating exemplary processing for simultaneously registering sheet attribute information in association with each tray in the tray information storing unit, which can be performed by a server according to a second exemplary embodiment.

Exemplary processing for simultaneously registering sheet attribute information in association with each tray in the tray information storing unit 402, which can be performed by the server 101 according to the second exemplary embodiment, is described in detail below with reference to a flowchart illustrated in FIG. 16.

First, in step S1601, the CPU 207 determines whether the registration screen 1800 illustrated in FIG. 18A has been called on the operation unit 209 of the server 101. If the CPU 207 determines that the registration screen 1800 has been called (YES in step S1601), the operation proceeds to step S1602. Otherwise, the CPU 207 repeats the processing in step S1601 until the registration screen 1800 is called.

In step S1602, the CPU 207 displays the registration screen 1800 illustrated in FIG. 18A on the operation unit 209 of the server 101. Then, the operation proceeds to step S1603.

In step S1603, the CPU 207 determines whether there is any event having occurred on the registration screen 1800 illustrated in FIG. 18A. If the CPU 207 determines that an event has occurred (YES in step S1603), the operation proceeds to step S1604. Otherwise, the CPU 207 repeats the processing in step S1603 until any event occurs.

In step S1604, the CPU 207 determines whether the occurrence event identified in step S1603 is an event of pressing a registration button 1805 on the registration screen 1800 illustrated in FIG. 18A. If the CPU 207 determines that the identified occurrence event is not the event of pressing the registration button 1805 (NO in step S1604), the operation proceeds to step S1605.

In step S1605, the CPU 207 determines whether the occurrence event identified in step S1603 is an event of pressing an addition button 1803 on the registration screen 1800 illustrated in FIG. 18A. If the CPU 207 determines that the identified occurrence event is the event of pressing the addition button 1803 (YES in step S1605), the operation proceeds to step S1606.

In step S1606, the CPU 207 displays an addition screen 1900 illustrated in FIG. 19 on the operation unit 209 to enable a user to additionally select a registered sheet in the sheet information storing unit 401 as a target sheet to be registered in association with the sheet holding unit 322 or the manual tray 327. Then, the operation proceeds to step S1607.

In step S1607, the CPU 207 acquires attribute information about an arbitrary sheet selected by a user on the addition screen 1900 from the sheets registered in the sheet information storing unit 401. Then, the operation proceeds to step S1608. The sheet attribute information acquired in step S1607 is, for example, a combination of sheet name, size, grammage, color, and type. In this case, the sheet attribute information acquired in step S1607 can be modified appropriately by editing a part of sheet size, grammage, color, and type values. Further, the attribute information (e.g., sheet name, size, grammage, color, and type) can be imported from an external apparatus, such as the information processing apparatus 104 or the printing apparatus 102.

In step S1608, the CPU 207 adds the sheet attribute information acquired in step S1607 to the registration screen 1800 illustrated in FIG. 18A.

For example, the A4-sized "A. Corporation Media 1" sheet 1811 is displayed on the registration screen 1800 illustrated in FIG. 18A. When a user presses the addition button 1803 on the registration screen 1800 illustrated in FIG. 18A, the addition screen 1900 illustrated in FIG. 19 is displayed on the operation unit 209 of the server 101. It is now presumed that the user selects a sheet having sheet attribute information "name: Paper 1, size: A4, grammage: 64 g/m$^2$, color: Blue, and type: coated paper" on the addition screen 1900. In such a case, the CPU 207 acquires the sheet attribute information "name: Paper 1, size: A4, grammage: 64 g/m$^2$, color: Blue, and type: coated paper." The acquired attribute information about "Paper 1" sheet 1812 is additionally displayed, as understood from the registration screen 1800 illustrated in FIG. 18B.

After completing the processing in step S1608, the operation returns to step S1603 and the CPU 207 performs the above-mentioned processing again.

On the other hand, if the determination result in step S1605 is NO, the operation of the CPU 207 proceeds to step S1609. In step S1609, the CPU 207 determines whether the occurrence event identified in step S1603 is an event of pressing an increment/decrement button 1802 (i.e., a button relating to the number of trays 1801) on the registration screen 1800 illustrated in FIG. 18A. If the CPU 207 determines that the identified occurrence event is the event of pressing the increment/decrement button 1802 (YES in step S1609), the operation proceeds to step S1610.

In step S1610, the CPU 207 determines each of the trays (i.e., the sheet holding unit 322 and the manual tray 327) whose number 1801 has been designated by the pressing of the increment/decrement button 1802 as sheet attribute information registration target. For example, as illustrated in the registration screen 1800 illustrated in FIG. 18A, three trays provided in the printing apparatus 102 are determined as registration targets with respect to attribute information about "A. Corporation Media 1" sheet 1811. After completing the processing in step S1610, the operation returns to step S1603 and the CPU 207 performs the above-mentioned processing again.

On the other hand, if the determination result in step S1609 is NO, the operation of the CPU 207 proceeds to step S1611. In step S1611, the CPU 207 performs another processing according to a user operation. The processing to be performed in step S1611 is, for example, processing for deleting the registration of a sheet attribute information registration target tray when a user presses a deletion button 1804 on the registration screen 1800 illustrated in FIG. 18A. After completing the processing in step S1611, the operation returns to step S1603 and the CPU 207 performs the above-mentioned processing again.

On the other hand, if the CPU 207 determines that the occurrence event identified in step S1603 is an event of pressing the registration button 1805 on the registration screen 1800 illustrated in FIG. 18A (YES in step S1604), the operation proceeds to step S1700.

Figure 17:
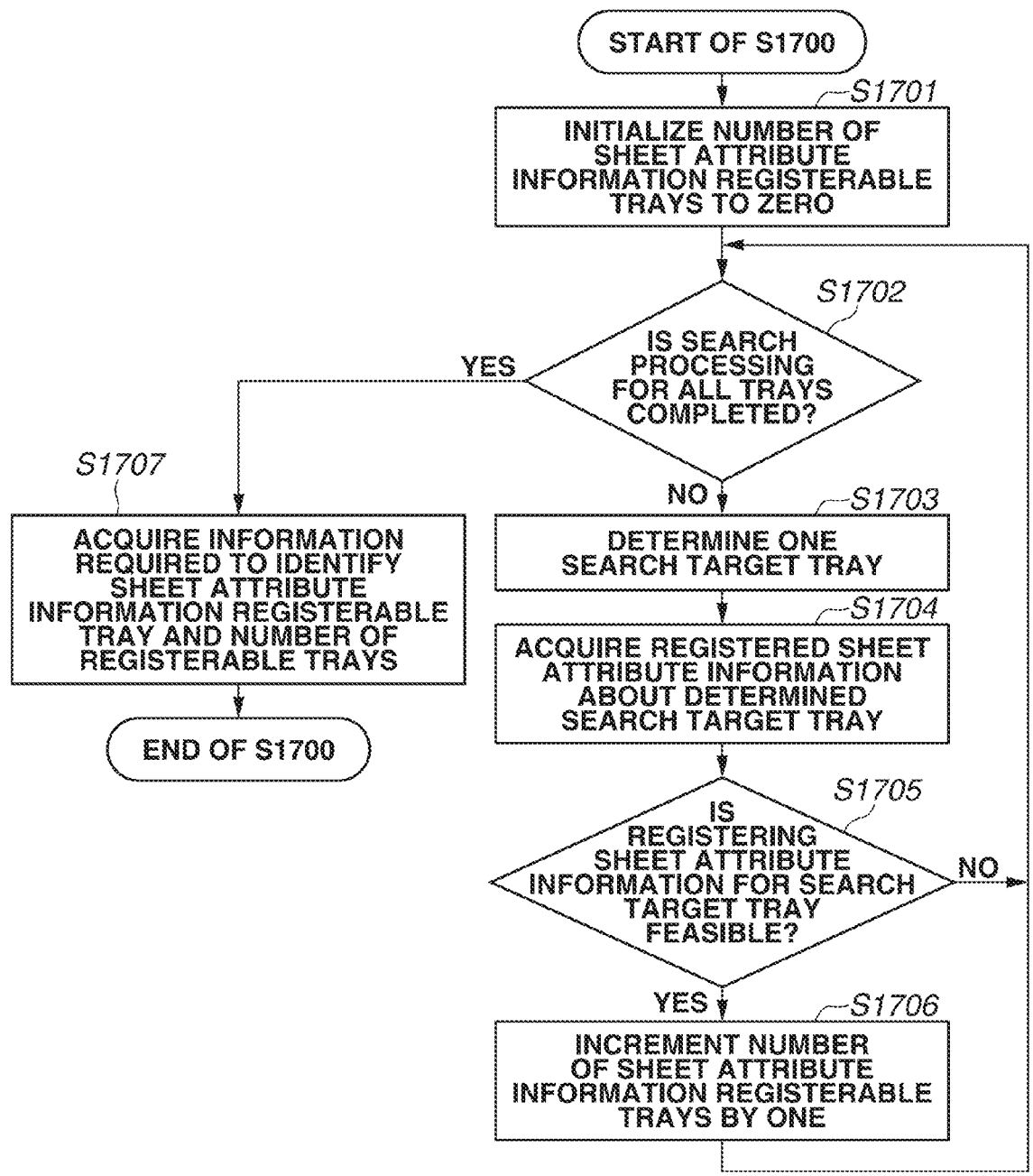
FIG. 17 is a flowchart illustrating exemplary processing for searching for a sheet attribute information registerable tray in the tray information storing unit, which can be performed by the server according to the second exemplary embodiment.

Subsequently, exemplary processing for searching for a sheet attribute information registerable tray in the tray information storing unit 402 (i.e., processing to be performed in step S1700) is described in detail below with reference to a flowchart illustrated in FIG. 17.

In step S1701, the CPU 207 initializes the number of sheet attribute information registerable trays to zero. Then, the operation proceeds to step S1702.

In step S1702, the CPU 207 determines whether the processing for searching for the sheet attribute information registerable tray has been completed for all trays provided in the printing apparatus 102 (i.e., the sheet holding unit 322 and the manual tray 327). If the CPU 207 determines that the search processing is not yet completed (NO in step S1702), the operation proceeds to step S1703.

In step S1703, the CPU 207 determines a search target tray by selecting one of all trays provided in the printing apparatus 102. Then, the operation proceeds to step S1704.

In step S1704, the CPU 207 acquires registered sheet attribute information about the search target tray determined in step S1703. Then, the operation proceeds to step S1705. For example, if the search target is the manual tray in the attribute information table 1300 illustrated in FIG. 13, the sheet attribute information acquired by the CPU 207 is "name: My Paper, size: A4, grammage: 100 g/m$^2$, color: Yellow, and type: tab sheet." Further, the sheet attribute information acquired by the CPU 207 is "name: Paper 2, size: A3, grammage: 80 g/m$^2$, color: White, and type: plain paper."

In step S1705, the CPU 207 determines whether sheet attribute information can be registered for the search target tray determined in step S1703. In a case where a plurality of sheets having the same size is already registered for the determined search target tray, it is unfeasible to register the sheet attribute information in association with the search target tray. The reason why the above-mentioned registration is prohibited is that uniquely identifying a sheet registered in association with each tray in the tray information storing unit 402 is feasible by referring to the information about the size of sheets stored in the sheet holding unit 322 or in the manual tray 327.

If the CPU 207 determines that the sheet attribute information can be registered (YES in step S1705), the operation proceeds to step S1706. On the other hand, if the determination result in step S1705 is NO, the operation returns to step S1702 and the CPU 207 performs the above-mentioned processing again.

In step S1706, the CPU 207 increments the number of sheet attribute information registerable trays by 1. Then, the operation returns to step S1702 and the CPU 207 performs the above-mentioned processing again.

On the other hand, if the CPU 207 determines that the search processing has been completed (YES in step S1702), the operation proceeds to step S1707.

In step S1707, the CPU 207 acquires information required to identify the sheet attribute information registerable tray and the number of sheet attribute information registerable trays. Then, the CPU 207 terminates the processing for searching for the sheet attribute information registerable tray in the tray information storing unit 402 (i.e. the processing in step S1700). The operation proceeds to step S1612 illustrated in FIG. 16.

In step S1612, the CPU 207 determines whether there is any insufficiency in the number of sheet attribute information registerable trays. More specifically, the determination in step S1612 can be performed by comparing the number of trays 1801 designated by a user on the registration screen 1800 illustrated in FIG. 18A with the number of sheet attribute information registerable trays acquired in step S1707.

If the CPU 207 determines that there is an insufficiency (YES in step S1612), the operation proceeds to step S1613.

Figure 20:
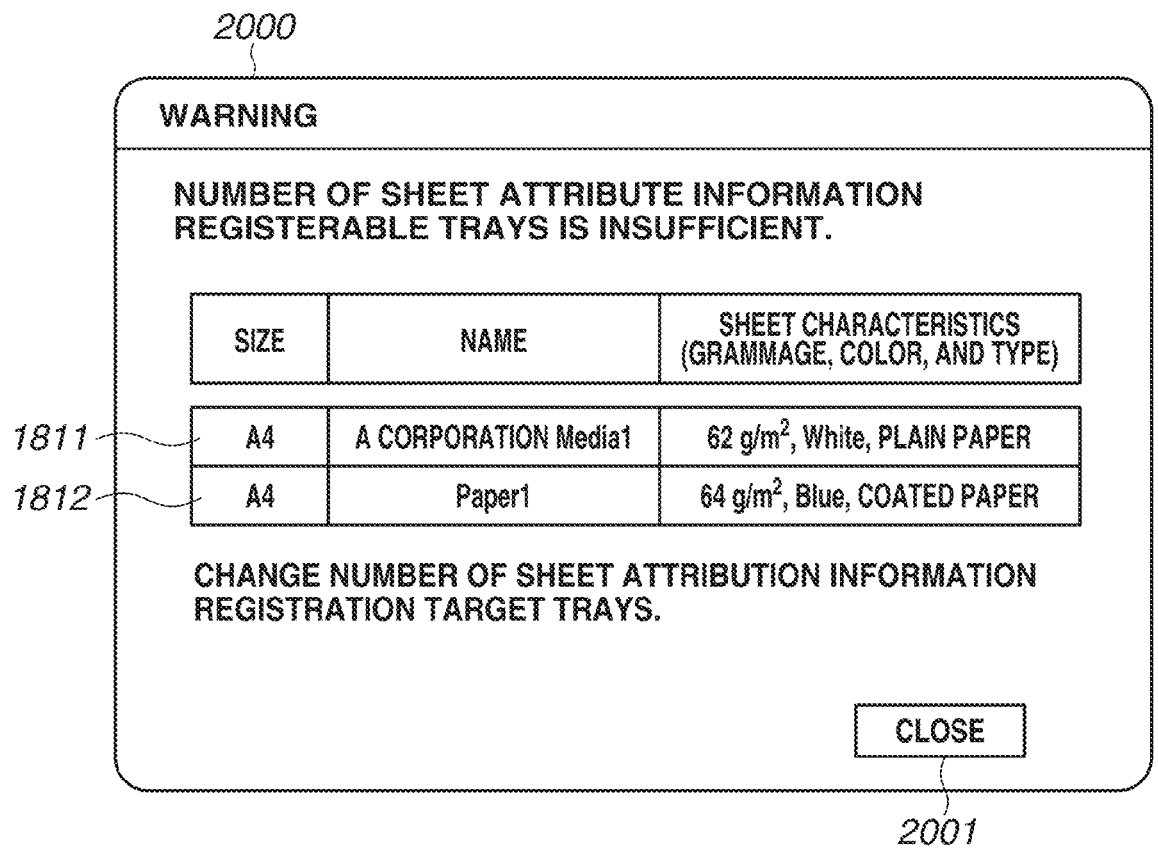
FIG. 20 illustrates a warning screen that is usable when sheet attribute information is registered in the tray information storing unit, in the server according to the second exemplary embodiment.

In step S1613, the CPU 207 displays a warning screen 2000 illustrated in FIG. 20 on the operation unit 209 of the server 101. The operation returns to step S1603 and the CPU 207 performs the above-mentioned processing again. A registration screen 2100 is usable to let a user change the number of sheet attribute information registration target trays because of the insufficiency in the number of sheet attribute information registerable trays.

For example, as understood from the registration screen 1800 illustrated in FIG. 18B, the number of registration target trays of the attribute information about A4-sized "A. Corporation Media 1" sheet 1811 is three and the number of registration target trays of the attribute information about "Paper 1" sheet 1812 is two. In other words, there are five registration target trays in total.

On the other hand, for example, as understood from the attribute information table 1300 illustrated in FIG. 13, the attribute information about A4-sized sheet is not registered for each of the sheet feeding trays Tray 4, Tray 6, Tray 7, and Tray 8. Therefore, the attribute information about A4-sized "A. Corporation Media 1" sheet 1811 can be registered in association with each of the above-mentioned four trays (i.e., Tray 4, Tray 6, Tray 7, and Tray 8). In other words, there is insufficiency in the number of sheet attribute information registerable trays.

Therefore, the system according to the present exemplary embodiment displays the warning screen 2000 illustrated in FIG. 20 on the operation unit 209. After confirming an indication or message displayed on the warning screen 2000, the user can reduce the number of registration target trays of the attribute information about A4-sized "Paper 1" sheet 1812 from 2 to 1 on the registration screen 1800 illustrated in FIG. 18B.

In this manner, the total number of registration target trays of the attribute information about "A. Corporation Media 1" sheet 1811 and the attribute information about "Paper 1" sheet 1812 is reduced from five to four. In other words, the system according to the present exemplary embodiment only requires each user to adjust the number of necessary sheet attribute information registerable trays.

On the other hand, if the CPU 207 determines that there is not any insufficiency in the number of sheet attribute information registerable trays (NO in step S1612), the operation proceeds to step S1614.

In step S1614, the CPU 207 displays the registration screen 2100 illustrated in FIG. 21 on the operation unit 209 of the server 101. Then, the operation proceeds to step S1615. For example, the registration screen 2100 illustrated in FIG. 21 lets a user simultaneously select three registration target trays of the attribute information about "A. Corporation Media 1" sheet 1811 by selectively pressing radio buttons 2101 of respective sheet feeding trays Tray 4, Tray 6, Tray 7, and Tray 8. Further, the registration screen 2100 lets the user select one registration target tray of the attribute information about "Paper 1" sheet 1812 among the sheet feeding trays Tray 4, Tray 6, Tray 7, and Tray 8.

In step S1615, the CPU 207 determines whether a registration button 2102 has been pressed on the registration screen 2100 illustrated in FIG. 21. However, in a case where the predetermined number of sheet attribute information registration target trays is not correctly selected, the registration button 2102 is grayed out and cannot be pressed on the registration screen 2100.

If the CPU 207 determines that the registration button 2102 has been pressed (YES in step S1615), the operation proceeds to step S1616. Otherwise, the CPU 207 repeats the processing in step S1615 until the registration button 2102 is pressed.

In step S1616, the CPU 207 performs batch registration of sheet attribute information in association with respective trays having been selected by the user on the registration screen 2100 illustrated in FIG. 21 in the tray information storing unit 402.

For example, according to the registration screen 2100 illustrated in FIG. 21, the CPU 207 simultaneously registers the sheet attribute information "name: A. Corporation Media 1, size: A4, grammage: 62 g/m$^2$, color: White, and type: plain paper" in association with respective sheet feeding trays Tray 6, Tray 7, and Tray 8 in the tray information storing unit 402.

Further, the CPU 207 registers the sheet attribute information "name: Paper 1, size: A4, grammage: 64 g/m$^2$, color: Blue, type: coated paper" in association with the sheet feeding tray Tray 4. Then, after completing the processing in step S1616, the CPU 207 terminates the processing for simultaneously registering sheet attribute information in association with each tray in the tray information storing unit 402.

As mentioned above, the server 101 according to the second exemplary embodiment can perform the sequential processing for simultaneously registering sheet attribute information in association with each tray in the tray information storing unit 402 provided in the HDD unit 205 of the server 101.

The printing apparatus 102 can perform similar processing comparable to the above-mentioned registration processing performed by the server 101. More specifically, in performing the above-mentioned registration processing, "the CPU 302", "the HDD 308", and "the operation unit 318" of the printing apparatus 102 are functionally comparable to "the CPU 207", "the HDD unit 205", and "the operation unit 209" of the server 101.

As mentioned above, the system according to the second exemplary embodiment accepts a user input with respect to the number of sheet attribute information registration target trays 1801. Further, the system searches for sheet attribute information registerable trays. Thus, the system can simultaneously register sheet attribute information in association with each tray in the tray information storing unit 402 according to the number of trays 1801 designated by the user.

More specifically, in a case where a plurality of trays (e.g., the sheet holding unit 322 and the manual tray 327) is used to store a great amount of sheets to be used in a job, it is feasible to simultaneously and easily set attribute information about the great amount of sheets to be used in the job as setting values of the plurality of trays. Therefore, user convenience can be greatly improved.

In the above-mentioned second exemplary embodiment, the system lets a user select sheet attribute information registration target trays on the registration screen 2100 illustrated in FIG. 21. However, as another exemplary embodiment, it is useful to display a confirmation screen 2200 illustrated in FIG. 22 on the operation unit 318 of the printing apparatus 102 to enable a user to visually confirm sheet attribute information registerable tray information 2201.

Then, the user stores sheets in any one of the sheet attribute information registerable trays. The system displays a selection screen 2300 illustrated in FIG. 23 on the operation unit 318 according to a detected sheet size (or size information acquired by accepting an input of the size). For example, the user selects the sheet attribute information "name: Paper 1, size: A4, grammage: 64 g/m², color: Blue, and type: coated paper" by pressing a radio button 2301 on the selection screen 2300 illustrated in FIG. 23. In this case, the sheet attribute information can be set as sheet attribute information registerable tray setting value without registering any sheet attribute information in association with each tray in the tray information storing unit 402 provided in the HDD unit 205 of the server 101.

The present invention is not limited to the above-mentioned exemplary embodiments. Each exemplary embodiment can be modified in various ways within the scope of the present invention. For example, two or more of the above-mentioned exemplary embodiments can be combined appropriately. The present invention encompasses such a composite embodiment.

For example, detectable (acquirable) attribute information about each sheet stored in a sheet holding unit or a manual tray is not limited to only the size. For example, it is useful to detect (acquire) and transmit a plurality of pieces of attribute information. The subsequent processing can be performed based on the detected (acquired) plurality of pieces of attribute information.

Further, for example, the information to be transmitted to the server 101 is not limited to the above-mentioned example (i.e., the size of a sheet stored in the sheet holding unit or in the manual tray). For example, the sensor provided in each sheet holding unit or the manual tray may be able to detect other characteristics (e.g., color, grammage, or type) of each sheet and additional sheet information about color, grammage, or type may be registered beforehand in the sheet information storing unit 401 or the tray information storing unit 402.

In such a case, it is useful to transmit the additional sheet information about color, grammage, or type together with the sheet size to the server 101 so that a sheet can be identified based on both of the sheet size and the sheet color, grammage, or type. Further, it is useful to transmit only the sheet color information to the server 101 so that a sheet can be identified based on only the sheet color.

More specifically, in a case where at least one of sheet size, grammage, color, and type is acquired as attribute information about a sheet stored in a tray, additional attribute information other than the acquired attribute information can be set as tray setting value.

Further, for example, the connection between the printing apparatus 102 and the server 101 (i.e., the externally provided apparatus) via the network 105 can be modified in various ways. For example, the server 101 can be provided as a built-in printing control apparatus in the printing apparatus 102. In such a case, the printing apparatus 102 and the server 101 can be configured to perform a part or the whole of the above-mentioned various control processing.

Further, the printing apparatus 102 can be configured to perform a part or the whole of the above-mentioned various control processing without relying on the processing to be performed by the server 101 (i.e., the printing control apparatus). More specifically, the printing apparatus 102 or the information processing apparatus 104 can be configured to include the server 101 that is functionally operable as a printing control apparatus. Further, the printing apparatus 102 can be connected to a plurality of information processing apparatuses 104 via the network 103 (e.g., LAN or WAN) or a wireless LAN in such a way as to perform a part or the whole of the above-mentioned various control processing.

Although the present invention has been described based on various examples and exemplary embodiments, it will not be difficult for a person skilled in the art to add various modifications without departing from the gist of the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-254564 filed Dec. 9, 2013, which is hereby incorporated by reference herein in its entirety.

What is claimed is:

1. A printing system including:
a printing control apparatus and a printing apparatus which is able to print an image on a sheet conveyed from a sheet holding unit among a plurality of sheet holding units,
wherein the printing control apparatus includes:
a designating unit configured to designate attribute information of a sheet,
a selecting unit configured to select sheet holding units from the plurality of sheet holding units,
an accepting unit configured to accept an instruction for storing the attribute information of the sheet designated by the designating unit in a state where the sheet holding units have been selected by the selecting unit, and
a storage configured to store, based on the instruction accepted by the accepting unit, sheet size information of the sheet and the attribute information of the sheet in association with each of the sheet holding units selected by the selecting unit,
wherein the printing apparatus includes:
an obtaining unit configured to obtain the sheet size information of a sheet stored in the sheet holding unit, and
a first sending unit configured to send, to the printing control apparatus, the sheet size information obtained by the obtaining unit,
wherein the printing control apparatus further includes:
a first receiving unit configured to receive the sheet size information sent by the first sending unit,
a determining unit configured to determine, based on the sheet size information received by the first receiving unit, the attribute information of the sheet stored in association with the sheet holding unit by the storage, wherein the sheet size information of the sheet stored in association with the sheet holding unit by the storage corresponds to the sheet size information received by the first receiving unit, and
a second sending unit configured to send, to the printing apparatus, the attribute information determined by the determining unit,
wherein the printing apparatus further includes:
a second receiving unit configured to receive the attribute information sent by the second sending unit,
a setting unit configured to set the attribute information received by the second receiving unit, as attribute information of a sheet stored in the sheet holding unit, and
a printer configured to print, based on the attribute information set by the setting unit, an image on the sheet conveyed from the sheet holding unit,
wherein the designating unit, the selecting unit, the accepting unit, the first receiving unit, the determining unit, and the second sending unit are implemented by a processor and a memory, and
wherein the obtaining unit, the first sending unit, the second receiving unit, and the setting unit are implemented by a processor and a memory.

2. The printing system according to claim 1,
wherein the designating unit designates attribute information of a sheet and sheet size information of the sheet by a user,
wherein the accepting unit further accepts an instruction for storing the attribute information of the sheet and the sheet size information of the sheet designated by the designating unit in a state where the sheet holding units have been selected by the selecting unit, and
wherein the printing control apparatus further includes:
a notification unit configured to notify a user of a warning in a case where an instruction that the same sheet size information of a plurality of sheets is to be stored in association with the same sheet holding unit among the plurality of sheet holding units is accepted by the accepting unit,
wherein the notification unit is implemented by a processor and a memory.

3. The printing system according to claim 1,
wherein the sheet holding unit is able to be opened and shut,
wherein the printing apparatus further includes a detection unit configured to detect that the sheet holding unit has been shut, and
wherein the obtaining unit obtains, according to detection performed by the detection unit, the sheet size information of the sheet stored in the sheet holding unit.

4. The printing system according to claim 1, wherein the sheet holding unit is a sheet feeding tray or a manual tray.

5. The printing system according to claim 1, wherein the attribute information includes at least one of a sheet grammage, a sheet color, and a sheet type.

6. A printing control apparatus comprising:
a designating unit configured to designate attribute information of a sheet;
a selecting unit configured to select sheet holding units from a plurality of sheet holding units of a printing apparatus;
an accepting unit configured to accept an instruction for storing the attribute information of the sheet designated by the designating unit in a state where the sheet holding units have been selected by the selecting unit;
a storage configured to store, based on the instruction accepted by the accepting unit, sheet size information of the sheet and the attribute information of the sheet in association with each of the sheet holding units selected by the selecting unit;
a receiving unit configured to receive, from the printing apparatus, the sheet size information of a sheet stored in a sheet holding unit among the plurality of sheet holding units;
a determining unit configured to determine, based on the sheet size information received by the receiving unit, the attribute information of the sheet stored in association with the sheet holding unit by the storage, wherein the sheet size information of the sheet stored in association with the sheet holding unit by the storage corresponds to the sheet size information received by the receiving unit; and
a sending unit configured to send, to the printing apparatus, the attribute information determined by determining unit, wherein the designating unit, the selecting unit, the accepting unit, the receiving unit, the determining unit, and the sending unit are implemented by a processor and a memory.

7. A printing system including:
a printing control apparatus and a printing apparatus which is able to print an image on a sheet conveyed from a sheet holding unit among a plurality of sheet holding units,
wherein the printing control apparatus includes:
a first designating unit configured to designate attribute information of a sheet,
a second designating unit configured to designate a number of sheet holding units to be selected from the plurality of sheet holding units,
an accepting unit configured to accept an instruction for storing the attribute information of the sheet designated by the first designating unit in a state where the sheet holding units have been selected based on the number of sheet holding units designated by the second designating unit, and
a storage configured to store, based on the instruction accepted by the accepting unit, sheet size information of the sheet and the attribute information of the sheet in association with each of the sheet holding units selected based on the number of sheet holding units designated by the second designating unit,
wherein the printing apparatus includes:
an obtaining unit configured to obtain the sheet size information of a sheet stored in the sheet holding unit, and
a first sending unit configured to send, to the printing control apparatus, the sheet size information obtained by the obtaining unit,
wherein the printing control apparatus further includes:
a first receiving unit configured to receive the sheet size information sent by the first sending unit,
a determining unit configured to determine, based on the sheet size information received by the first receiving unit, the attribute information of the sheet stored in association with the sheet holding unit by the storage, the sheet size information of the sheet stored in association with the sheet holding unit by the storage corresponding to the sheet size information received by the first receiving unit, and
a second sending unit configured to send, to the printing apparatus, the attribute information determined by the determining unit,
wherein the printing apparatus further includes:
a second receiving unit configured to receive the attribute information sent by the second sending unit,
a setting unit configured to set the attribute information received by the second receiving unit, as attribute information of a sheet stored in the sheet holding unit, and
a printer configured to print, based on the attribute information set by the setting unit, an image on the sheet conveyed from the sheet holding unit,
wherein the first designating unit, the second designating unit, the accepting unit, the obtaining unit, the first receiving unit, the determining unit, and the second sending unit are implemented by a processor and a memory, and
wherein the obtaining unit, the first sending unit, the second receiving unit, and the setting unit are implemented by a processor and a memory.

8. A method for controlling a printing control apparatus having a storage, the method comprising:
designating attribute information of a sheet by a user;
selecting sheet holding units from a plurality of sheet holding units of a printing apparatus;
accepting an instruction for storing the designated attribute information of the sheet in a state where the sheet holding units have been selected;
storing, in the storage and based on the accepted instruction, sheet size information of the sheet and the attribute information of the sheet in association with each of the selected sheet holding units;
receiving, from the printing apparatus, the sheet size information of a sheet stored in a sheet holding unit among the plurality of sheet holding units;
determining, based on the received sheet size information, the attribute information of the sheet stored in association with the sheet holding unit by the storage, wherein the sheet size information of the sheet stored in association with the sheet holding unit by the storage corresponds to the received sheet size information; and
sending, to the printing apparatus, the determined attribute information.

9. A non-transitory computer readable storage medium storing a program to cause a printing control apparatus to perform a method for controlling a printing control apparatus having a storage, the method comprising:
designating attribute information of a sheet by a user;
selecting sheet holding units from a plurality of sheet holding units of a printing apparatus;
accepting an instruction for storing the designated attribute information of the sheet in a state where the sheet holding units have been selected;
storing, in the storage and based on the accepted instruction, sheet size information of the sheet and the attribute information of the sheet in association with each of the selected sheet holding units;
receiving, from the printing apparatus, the sheet size information of a sheet stored in a sheet holding unit among the plurality of sheet holding units;
determining, based on the received sheet size information, the attribute information of the sheet stored in association with the sheet holding unit by the storage, wherein the sheet size information of the sheet stored in association with the sheet holding unit by the storage corresponds to the received sheet size information; and
sending, to the printing apparatus, the determined attribute information.

10. A printing system including:
a printing control apparatus and a printing apparatus which is able to print an image on a sheet conveyed from a sheet holding unit among a plurality of sheet holding units,
wherein the printing control apparatus includes:
a designating unit configured to designate attribute information of a sheet by a user,
a selecting unit configured to select sheet holding units from the plurality of sheet holding units,
an accepting unit configured to accept an instruction for storing the attribute information of the sheet designated by the designating unit in a state where the sheet holding units have been selected by the selecting unit, and
a storage configured to store, based on the instruction accepted by the accepting unit, the attribute information of the sheet in association with each of the sheet holding units selected by the selecting unit, wherein the printing apparatus includes:
an obtaining unit configured to obtain identification information for the sheet holding unit, and
a first sending unit configured to send, to the printing control apparatus, the identification information for the sheet holding unit obtained by the obtaining unit,
wherein the printing control apparatus further includes:
a first receiving unit configured to receive the identification information for the sheet holding unit sent by the first sending unit,
a determining unit configured to determine, based on the identification information for the sheet holding unit received by the first receiving unit, the attribute information of the sheet stored in association with the sheet holding unit by the storage, and
a second sending unit configured to send, to the printing apparatus, the attribute information determined by the determining unit,
wherein the printing apparatus further includes:
a second receiving unit configured to receive the attribute information sent by the second sending unit,
a setting unit configured to set the attribute information received by the second receiving unit, as attribute information of a sheet stored in the sheet holding unit, and
a printer configured to print, based on the attribute information set by the setting unit, an image on the sheet conveyed from the sheet holding unit,
wherein the designating unit, the selecting unit, the accepting unit, the obtaining unit, the first sending unit, the first receiving unit, the determining unit, the second sending unit, the second receiving unit, and the setting unit are implemented by a processor and a memory.

11. An information processing apparatus comprising:
an interface configured to receive an instruction for collectively associating identical attribute information of a sheet with a plurality of sheet holding units; and
an associating unit configured to collectively associate the identical attribute information of a sheet with the plurality of sheet holding units according to reception of the instruction by the interface,
wherein the associating unit is implemented by a processor and a memory.

12. The information processing apparatus according to claim 11, the information processing apparatus further comprising a setting unit configured to set the identical attribute information of a sheet associated with a first sheet holding unit by the associating unit as attribute information of a sheet stored in the first sheet holding unit, and to set the identical attribute information of a sheet associated with a second sheet holding unit by the associating unit as attribute information of a sheet stored in the second sheet holding unit,
wherein the setting unit is implemented by a processor and a memory.

13. The information processing apparatus according to claim 12,
wherein the first sheet holding unit and the second sheet holding unit are able to be opened and closed,
wherein the information processing apparatus further comprises:
a first detecting sensor configured to detect that the first sheet holding unit has been closed; and
a second detecting sensor configured to detect that the second sheet holding unit has been closed, and
wherein the setting unit sets the identical attribute information of a sheet associated with the first sheet holding unit by the associating unit as the attribute information of a sheet stored in the first sheet holding unit, according to detection by the first detecting sensor that the first sheet holding unit has been closed, and sets the identical attribute information of a sheet associated with the second sheet holding unit by the associating unit as the attribute information of a sheet stored in the second sheet holding unit, according to detection by the second detecting sensor that the second sheet holding unit has been closed.

14. The information processing apparatus according to claim 11, the information processing apparatus further comprising a selecting unit configured to select sheet holding units from a plurality of sheet holding units,
wherein the interface receives the instruction for collectively associating the identical attribute information of a sheet with sheet holding units selected from the plurality of the sheet holding units, and
wherein the selecting unit is implemented by a processor and a memory.

15. The information processing apparatus according to claim 14, wherein, in a state where a first sheet holding unit and a second sheet holding unit are selected using a screen, the interface receives the instruction for collectively associating the identical attribute information of a sheet with the first sheet holding unit and the second sheet holding unit using the same screen as the screen.

16. The information processing apparatus according to claim 11, the information processing apparatus further comprising:
a memory configured to store a plurality of attribute information of a sheet; and
a designating unit configured to designate the identical attribute information of a sheet, from among the plurality of attribute information of a sheet stored in the memory,
wherein the interface receives the instruction for collectively associating the identical attribute information of a sheet designated by the designating unit with the plurality of sheet holding units, and
wherein the designating unit is implemented by a processor and a memory.

17. The information processing apparatus according to claim 11, wherein each of the sheet holding units is a sheet tray or a manual tray.

18. The information processing apparatus according to claim 11, wherein the identical attribute information of a sheet includes at least one of a sheet grammage, a sheet color, and a sheet type.

19. A control method in an information processing apparatus, the control method comprising:
receiving an instruction for collectively associating identical attribute information of a sheet with a plurality of sheet holding units; and
collectively associating the identical attribute information of a sheet with the plurality of sheet holding units, according to reception of the instruction in the receiving.

20. A non-transitory computer readable storage medium for storing a computer program for controlling an information processing apparatus, the control method comprising:
receiving an instruction for collectively associating identical attribute information of a sheet with a plurality of sheet holding units; and
collectively associating the identical attribute information of a sheet with the plurality of sheet holding units, according to reception of the instruction in the receiving.

* * * * *